US012615266B2

(12) United States Patent
Peled et al.

(10) Patent No.: US 12,615,266 B2
(45) Date of Patent: Apr. 28, 2026

(54) DATA MODIFICATION DETECTION

(71) Applicant: Honeywell International Inc.,
Charlotte, NC (US)

(72) Inventors: Niv Peled, Even Yehuda (IL); Adam Engelhart, Bruchin (IL); Paz Fichman, Tel aviv (IL); Eli Khitrov, Tel Aviv (IL)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/889,453

(22) Filed: Sep. 19, 2024

(65) Prior Publication Data

US 2026/0081928 A1     Mar. 19, 2026

(51) Int. Cl.
H04L 9/40          (2022.01)

(52) U.S. Cl.
CPC .................................. H04L 63/123 (2013.01)

(58) Field of Classification Search
CPC .................................................... H04L 63/123
See application file for complete search history.

(56) References Cited

U.S. PATENT DOCUMENTS

| | | | | |
|---|---|---|---|---|
| 8,200,246 B2 * | 6/2012 | Khosravy | .......... | G01C 21/3811 |
| | | | | 455/457 |
| 2016/0119372 A1 * | 4/2016 | Borlick | ................. | G06F 21/577 |
| | | | | 726/25 |
| 2016/0179167 A1 * | 6/2016 | Yeo | ........................ | G06F 1/3206 |
| | | | | 713/340 |
| 2016/0321660 A1 * | 11/2016 | Liu | ....................... | G06Q 20/384 |
| 2021/0004773 A1 * | 1/2021 | Dolan | .................. | G06Q 20/027 |
| 2021/0117236 A1 * | 4/2021 | Patel | ........................ | G06N 3/09 |
| 2025/0015991 A1 * | 1/2025 | Balmelli | ................... | H04L 9/14 |

* cited by examiner

*Primary Examiner* — El Hadji M Sall
(74) *Attorney, Agent, or Firm* — Alston & Bird LLP

(57) ABSTRACT

Techniques for data modification detection are disclosed. Descriptive information, including a resource identifier and a set of descriptive elements having a schema of representation, is received from a resource. Further, elementary information, including at least one of elementary resource identifier and set of elementary descriptors having an elementary schema of representation, corresponding to the resource is retrieved from a resource inventory database. A preliminary assessment is performed to assess similarity between the schema of representation and the elementary schema of representation. If the schemas are ascertained to be similar, a subsequent check is then performed to deduce a similarity between the set of descriptive elements and the set of elementary descriptors. Based on the subsequent assessment, an information-variance signal is generated to trigger rendering of an indication to indicate a probable modification of the set of descriptive elements in comparison with the set of elementary descriptors.

20 Claims, 11 Drawing Sheets

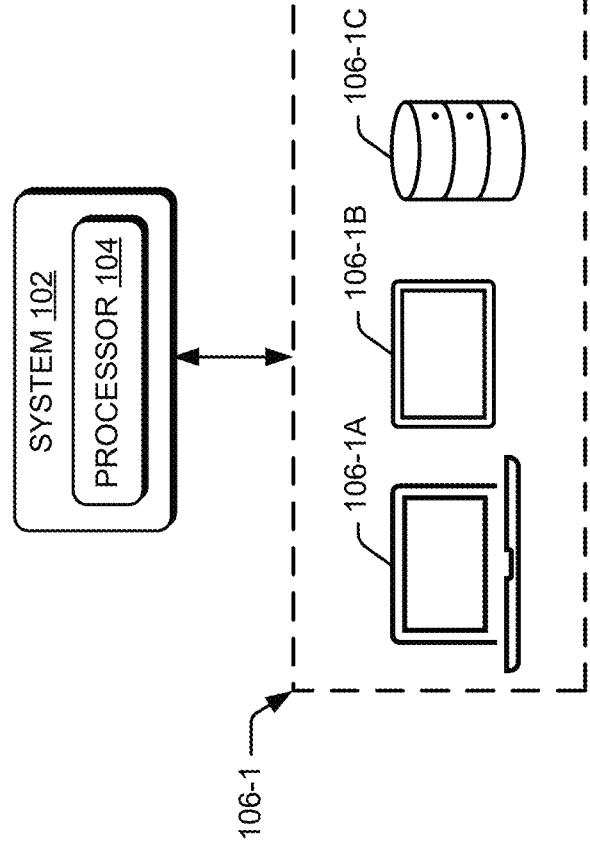
FIGURE 1A

200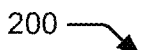

| RESOURCE(S) | ELEMENTARY RESOURCE IDENTIFIER | SET OF ELEMENTARY DESCRIPTORS |
|---|---|---|
| COMPUTING DEVICE 106-1A | MAC: 54:10:EC:BC:41 | OPERATIONAL STATUS: READY FIRMWARE VERSION: 5.1 |
| USER DEVICE 106-1B | IP ADDRESS: 192.193.0.181 | SOFTWARE VERSION: 14.1.0123 |
| SERVER 106-1C | IMEI:12345671234 | RESOURCE DESCRIPTION: BACnet iSMA-B-4U |
| NETWORKING DEVICE 106-2A | MAC: 00:2310:MC:21_41 | OPERATIONAL STATUS: ACTIVE VENDOR NAME: XYZ CORP |
| USER EQUIPMENT 106-2B | IMEI:12356789 | RESOURCE NAME: USER_EQUIPMENT |
| DATABASE 106-2C | IP ADDRESS: 198.193.0.100 | STORAGE: 1.07 TERABYTE TYPE:NTFS |

FIGURE 2

SYSTEM 102

PROCESSOR 104

SYSTEM 102

PROCESSOR 104

DATA RECEPTION UNIT 408

DATA PROCESSING UNIT 412

SIGNAL GENERATION UNIT 414

INTERFACE(S) 404

OTHER UNIT(S) 406

RESOURCE INVENTORY DATABASE 108

COMMUNICATION NETWORK 112

410

NETWORK 106-1

NETWORK 106-2

NETWORK 106-N

410

| RESOURCE | RESOURCE IDENTIFIER | SET OF DESCRIPTIVE ELEMENTS |
|---|---|---|
| USER DEVICE 106-1B | IP ADDRESS: 192.193.0.181 | SOFTWARE VERSION: 14.1.0123 |

502

410

| RESOURCE | RESOURCE IDENTIFIER | SET OF DESCRIPTIVE ELEMENTS |
|---|---|---|
| USER DEVICE 106-1B | IP ADDRESS: 192.193.0.181 | SOFTWARE VERSION: 14.10.123 |

700 —

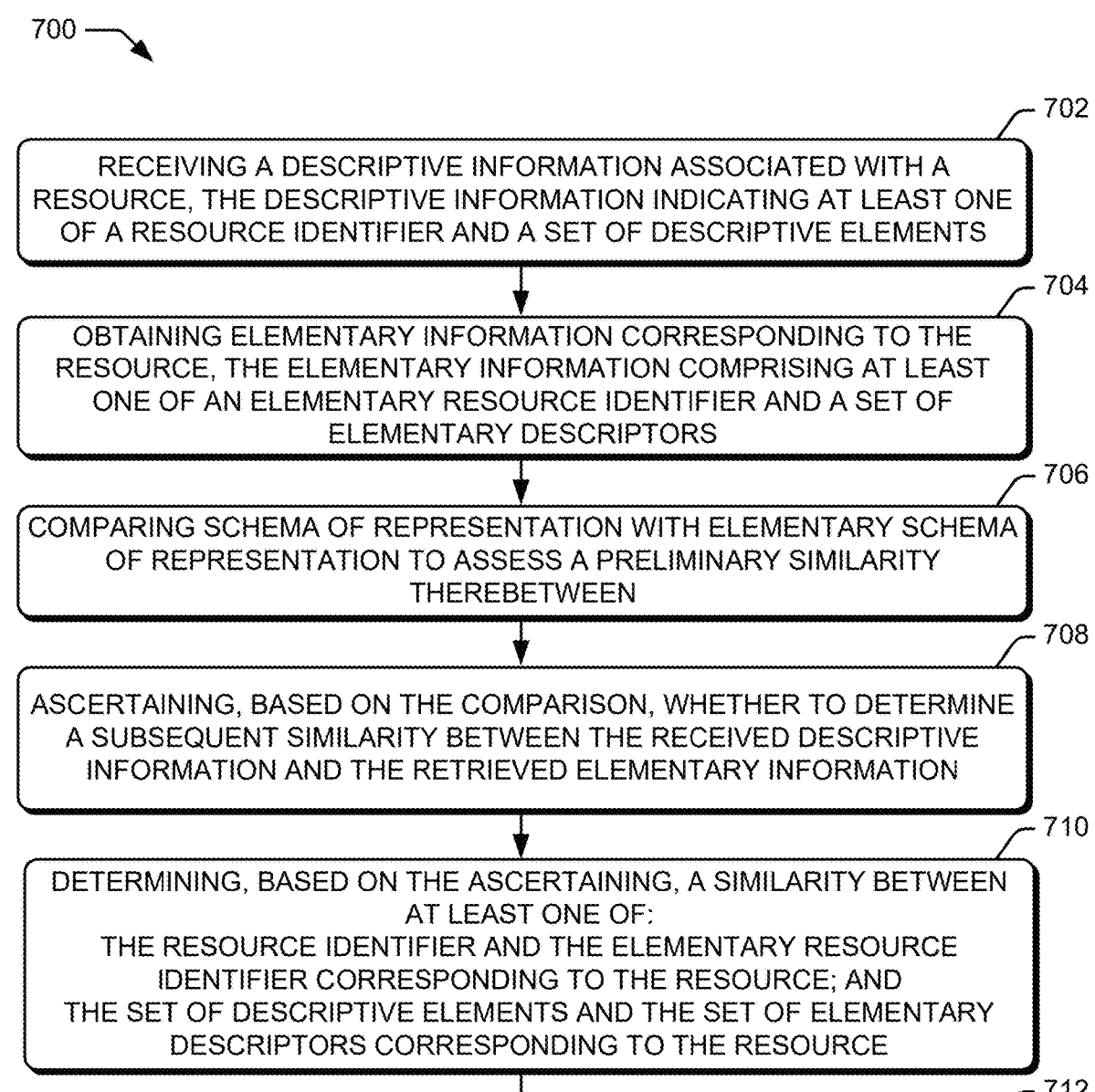

702

RECEIVING A DESCRIPTIVE INFORMATION ASSOCIATED WITH A RESOURCE, THE DESCRIPTIVE INFORMATION INDICATING AT LEAST ONE OF A RESOURCE IDENTIFIER AND A SET OF DESCRIPTIVE ELEMENTS

704

OBTAINING ELEMENTARY INFORMATION CORRESPONDING TO THE RESOURCE, THE ELEMENTARY INFORMATION COMPRISING AT LEAST ONE OF AN ELEMENTARY RESOURCE IDENTIFIER AND A SET OF ELEMENTARY DESCRIPTORS

706

COMPARING SCHEMA OF REPRESENTATION WITH ELEMENTARY SCHEMA OF REPRESENTATION TO ASSESS A PRELIMINARY SIMILARITY THEREBETWEEN

708

ASCERTAINING, BASED ON THE COMPARISON, WHETHER TO DETERMINE A SUBSEQUENT SIMILARITY BETWEEN THE RECEIVED DESCRIPTIVE INFORMATION AND THE RETRIEVED ELEMENTARY INFORMATION

710

DETERMINING, BASED ON THE ASCERTAINING, A SIMILARITY BETWEEN AT LEAST ONE OF:
THE RESOURCE IDENTIFIER AND THE ELEMENTARY RESOURCE IDENTIFIER CORRESPONDING TO THE RESOURCE; AND
THE SET OF DESCRIPTIVE ELEMENTS AND THE SET OF ELEMENTARY DESCRIPTORS CORRESPONDING TO THE RESOURCE

712

GENERATING, BASED ON THE DETERMINATION OF SIMILARITY, AN INFORMATION-VARIANCE SIGNAL TO CAUSE RENDERING OF AN ALERT FOR INDICATING A PROBABLE MODIFICATION OF THE DESCRIPTIVE INFORMATION CORRESPONDING TO THE RESOURCE

Figure 8A:
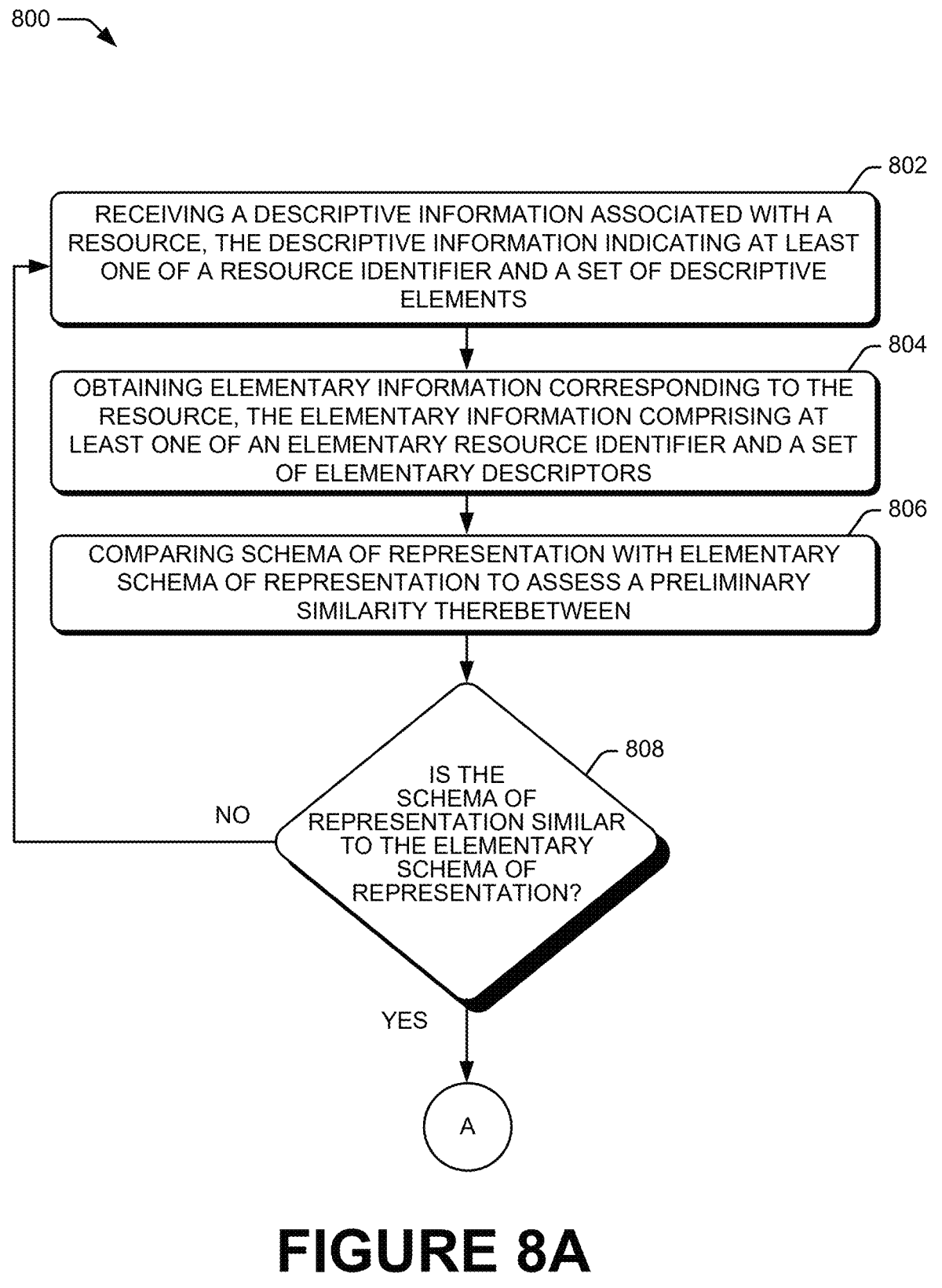

RECEIVING A DESCRIPTIVE INFORMATION ASSOCIATED WITH A RESOURCE, THE DESCRIPTIVE INFORMATION INDICATING AT LEAST ONE OF A RESOURCE IDENTIFIER AND A SET OF DESCRIPTIVE ELEMENTS

804

OBTAINING ELEMENTARY INFORMATION CORRESPONDING TO THE RESOURCE, THE ELEMENTARY INFORMATION COMPRISING AT LEAST ONE OF AN ELEMENTARY RESOURCE IDENTIFIER AND A SET OF ELEMENTARY DESCRIPTORS

806

COMPARING SCHEMA OF REPRESENTATION WITH ELEMENTARY SCHEMA OF REPRESENTATION TO ASSESS A PRELIMINARY SIMILARITY THEREBETWEEN

808

IS THE SCHEMA OF REPRESENTATION SIMILAR TO THE ELEMENTARY SCHEMA OF REPRESENTATION?

NO

YES

900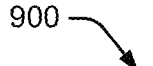

PROCESSOR(S)
902

906

RESOURCE
INVENTORY
DATABASE 108

COMPUTER-READABLE MEDIUM 904

COMPUTER-READABLE INSTRUCTION 908

[[RECEIVE DESCRIPTIVE INFORMATION FROM A RESOURCE ASSOCIATED WITH A NETWORK COMPRISING A PLURALITY OF RESOURCES, THE DESCRIPTIVE INFORMATION INDICATING AT LEAST ONE OF A RESOURCE IDENTIFIER AND A SET OF DESCRIPTIVE ELEMENTS, WHEREIN THE SET OF DESCRIPTIVE ELEMENTS HAS A SCHEMA OF REPRESENTATION;

OBTAIN ELEMENTARY INFORMATION CORRESPONDING TO THE RESOURCE, WHEREIN THE ELEMENTARY INFORMATION IS AN INSTANCE OF THE DESCRIPTIVE INFORMATION STORED IN A RESOURCE INVENTORY DATABASE BEFORE RECEPTION OF THE DESCRIPTIVE INFORMATION FROM THE RESOURCE;

PERFORM, IN RESPONSE TO THE OBTAINING THE ELEMENTARY INFORMATION, A PRELIMINARY ASSESSMENT OF SIMILARITY BETWEEN THE RECEIVED DESCRIPTIVE INFORMATION AND THE RETRIEVED ELEMENTARY INFORMATION;

ASCERTAIN, BASED ON THE COMPARISON, WHETHER TO PERFORM A SUBSEQUENT ASSESSMENT OF SIMILARITY BETWEEN THE RECEIVED DESCRIPTIVE INFORMATION AND THE RETRIEVED ELEMENTARY INFORMATION;

DETERMINE, IN RESPONSE TO ASCERTAINING TO PERFORM THE SUBSEQUENT ASSESSMENT;
GENERATE, BASED ON THE DETERMINATION OF SIMILARITY, AN INFORMATION-VARIANCE SIGNAL FOR INDICATING MODIFICATION OF THE DESCRIPTIVE INFORMATION IN COMPARISON TO THE ELEMENTARY INFORMATION]]

FIGURE 9

DATA MODIFICATION DETECTION

BACKGROUND

Various devices or resources are linked together in a network for communication purposes and for exchanging data and signals. Such resources may include networking equipment, computing client devices, and other components that enable data and signal transmission within the network. While these resources may often belong to a single network, it is also possible for resources from different networks to be communicably linked, allowing for inter-network communication and data exchange. This interconnectivity facilitates the flow of information or data between diverse components across one or multiple network environments.

BRIEF DESCRIPTION OF DRAWINGS

The detailed description is described with reference to the accompanying figures. It should be noted that the description and figures are merely examples of the present subject matter and are not meant to represent the subject matter itself.

FIGS. 1A to 1C illustrate a block diagram of a computing environment, according to an example implementation of the present subject matter.

FIG. 2 illustrates a database having elementary information corresponding to each resource associated with one or more networks, according to one example implementation of the present subject matter.

FIG. 3 illustrates a block diagram of a system, according to one example implementation of the present subject matter.

FIG. 7 illustrates a method for detecting modification in data, according to an example implementation of the present subject matter.

FIGS. 8A and 8B illustrate a method for detecting modification in data, according to another example implementation of the present subject matter.

FIG. 9 illustrates a non-transitory computer-readable medium for detecting modification in data, in accordance with an example of the present subject matter.

Figure 1B:
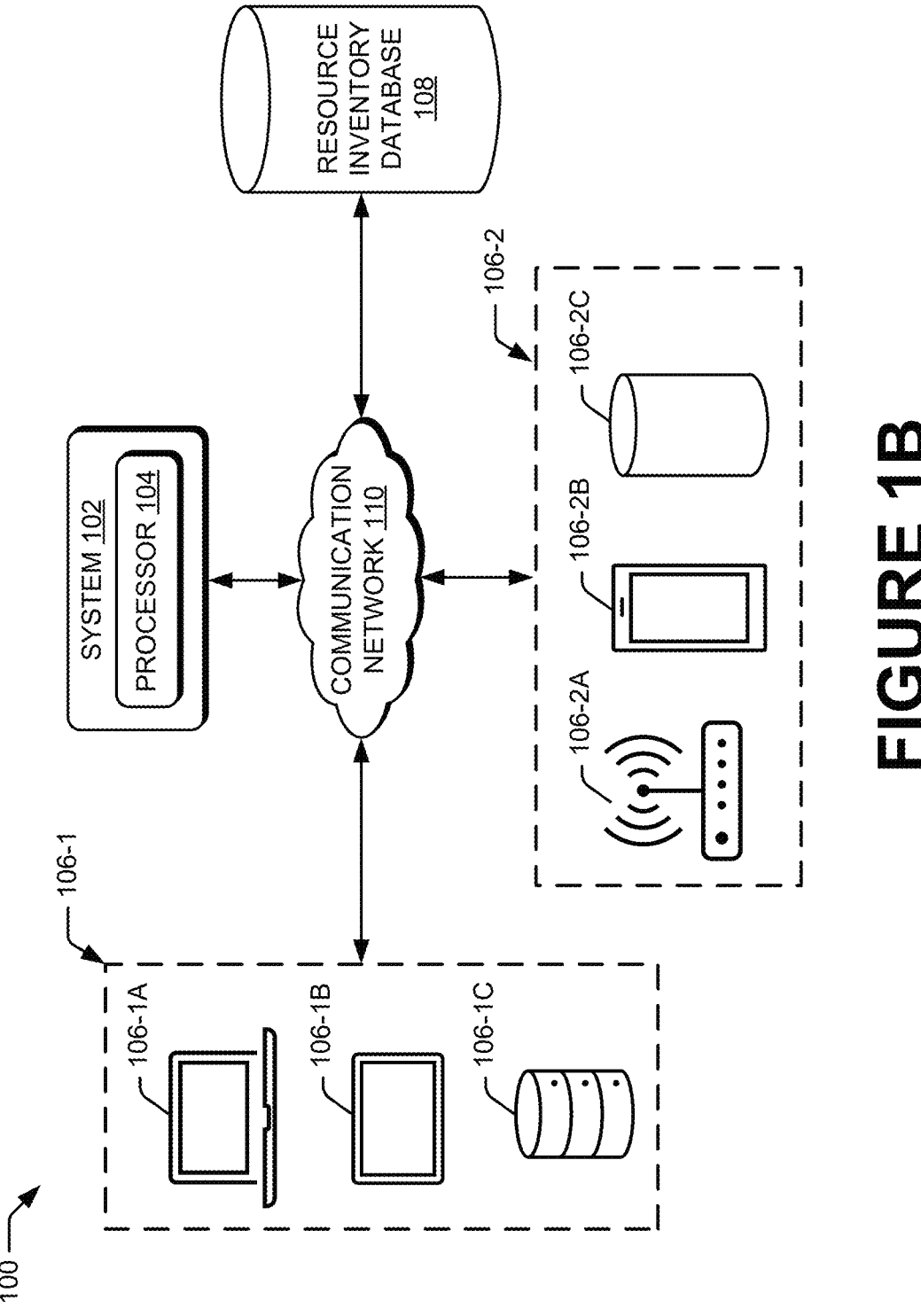

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In a network, there are multiple devices or resources communicably coupled with one another. Such resources may be, for example, routers, switches, servers, client devices, computing systems or workstations, and other resources or devices that may facilitate the exchange of data and signals between the resources and across the network. The resources, in one example, may be associated with the same network. It may also be possible, in another example, that the resources may be associated with different networks and may be communicably coupled with each other to exchange data and signals.

Data and signals may be transmitted, received, or otherwise exchanged between various resources in a network. Such communications and exchanges may be, for example, a frequent or integral aspect of resource interactions. In one example, the data may be indicative of one or more aspects related to the resources. For example, the data may indicate a firmware version of the resource, identification information for uniquely identifying the resource, a software version, and descriptive information that may provide additional details about the resource. In one example, the data may be communicated by a resource to one or more other resources. In another example, the data may be communicated along with information or signal that the resource intends to, or is configured to, exchange or communicate to the one or more other resources. For example, the data may be shared as metadata along with the information or the signal. The data may, for instance, help in identifying and verifying the resource. The data may also be utilized for monitoring and/or determining other aspects, for example, properties, status, functioning, and performance of the resource.

Generally, the data may be represented according to any pre-defined rule, protocol, schema, or format. For example, the representation of the data may include one or more spaces, special characters, and/or punctuations within the data, thereby representing or structuring the data in a specific manner or representation. Thus, when the data associated with a resource is communicated to one or more other resources, the data may have a specific representation.

However, there may be events or conditions that may affect the consistency of the data or representation of the data. For example, the data, or representation thereof, associated with a resource may change over time due to firmware or software updates. It may also be possible, in one example, that the network may include resources that utilize or switch between different protocols or schemas for exchanging or transmitting the data. In such cases, the transmitted data, or the representation thereof, may vary or be inconsistent over a period. Further, the changes could occur due to maintenance activities. For example, the changes may occur due to modification in one or more aspects or configurations of a resource. In such a case, it may be possible that the resource may communicate different data as compared to the data that was being communicated before the maintenance activities. Furthermore, the changes could also occur due to unauthorized or unintended events, for example, data breaches or malicious activities.

It may also be possible that the transmitted data, or representation thereof, is subjected to different networking or communication-related challenges and, thereby undergoes modification. For example, the transmitted data may be subjected to interference, transmission or reception inefficiencies, and data packet losses. Such reasons may thus result in modification of the transmitted data or representation thereof. Also, in a network, the data transmitted or sent by a resource may be channeled through multiple data paths or other devices such as networking or communication-related devices. It may be possible, in one example, that the data transmitted by the resource undergoes modification due to following such data paths or due to interaction or involvement of such devices. Therefore, due to different circumstances or events, it is possible that the data, and/or representations thereof, being communicated by a resource may become inconsistent or be modified.

Monitoring and detecting changes in the data, and/or representation thereof, becomes increasingly important for several reasons. For example, detecting changes in the data, and the representation thereof, may indicate whether the network includes the same set of resources or whether one or more resources have been changed or compromised. While such changes can be authentic, however, there is always a possibility that a resource in a network may have been compromised. For example, a resource in a network may be maliciously changed or configured to function in an unauthorized or unintended manner. Such events may cause the resource to transmit different data. Thus, modification of the data, and/or their representation or format, may indicate potential security threats, such as malicious or unauthorized activities.

Further, changes in the data and/or representation thereof, whether intended or unintended, may cause performance issues or communication failures. For example, resources in a network may be recognized or identified based on the data associated with them. In the network, the resources may be configured to communicate with other recognized resources. However, in case of changes in the data associated with one or more resources, the one or more resources may become unrecognizable and may be identified as unauthentic or invalid. Such instances may cause a failure of, or at least hinder, the communication between the resources. As such failures may hinder or completely disrupt communications and data exchanges, it may be possible that the network may no longer remain functional or operational. Furthermore, in many industries, regulatory compliance requires organizations to monitor and report data changes, especially when dealing with sensitive or personal information. Therefore, detecting changes in the data, or representation thereof, may help in determining whether such requirements are being complied with.

Conventionally, techniques for detecting change in network communications often rely on manual monitoring or simple threshold-based detections. However, such techniques may be tedious, time-consuming, and inadequate for handling the volume, velocity, and variety of data in modern networks. Such techniques may also struggle to identify subtle or complex changes that could be indicative of important events. Further, such manual monitoring and detection techniques may be prone to erroneous detections.

With advancements in technology, various solutions have been developed to automate detection techniques. However, such solutions have multiple drawbacks. For example, such solutions may analyse the data being communicated or exchanged between the resources to detect a change in the data, and actively generate and push alerts on the network to indicate such detections. However, in many cases, it may be possible that the data may be consistent, and only the representation may have been slightly, or completely, modified. That is, the essence of the data may remain same but the protocol or format, with which the data is represented, may be different as compared to the data previously exchanged. Such solutions, in these cases, often conclude or determine that the data has changed and actively push alerts on the network. Since the essence of the data has not been modified or is consistent, such alerts may tend to be irrelevant or unnecessary. Thus, such solutions were prone to false detections, i.e., detecting that the data has undergone some modification while only the representation may have been modified. Further, such solutions may lead to flooding of unnecessary alerts over the network, thereby increasing network traffic and congestion, and leading to inefficient use of network resources.

Further, such solutions fail to clearly distinguish whether the data or representation, or both, has undergone a probable change. Due to such limitations, users, for example, network administrators may not be able to clearly and distinguishingly ascertain that the alert was generated due to change in the data or due to change in the representation only. The users may then have to manually analyse the data to ascertain whether it was the change in data or change in the representation that caused generation of the alerts. Thus, such solutions, eventually, place reliance on the users to identify the cause of such alerts. Therefore, the conventional solutions may still require tedious and time-consuming manual efforts and may turn out to be inadequate for handling large volumes and varieties of the data. The challenges may further increase with subtle and complex changes that could be indicative of important events.

Further, due to absence of clarity on the reason or cause of such alerts, the users may not be able to swiftly determine necessary course of action that may be adopted to rectify such events. Thus, in many cases, it may be possible that communications within a network may remain in a failed or disrupted state for a longer period. As a result, the network may experience increased downtime and reduced overall operational efficiency.

The present subject matter relates to techniques for detection of data modification. According to one example, a data transmission may be received from a resource amongst a set of resources associated with a network. The data transmission may include descriptive information associated with the resource. In one example, the descriptive information may indicate at least one of a resource identifier that may uniquely identify the resource and a set of descriptive elements that may provide an insight about one or more aspects related to the resource. The resource identifier may be, for example, a Media Access Control (MAC) address and a designated resource ID associated with the resource. The one or more aspects may be, for example, properties or configurations of the resource, a firmware or software version of the resource, and other information that may provide additional details about the resource. The other information may indicate, for example, the name of the resource, resource type, resource description, and Operating System (OS) details.

Further, the set of descriptive elements may have a schema of representation. In one example, the schema of representation may be a protocol or format in which the set of descriptive elements is being represented in the received descriptive information. For example, the schema of representation may indicate the structure or arrangement of alphabets, numbers, special characters, and/or spaces in the set of descriptive elements. The schema of representation may thus indicate a format or pattern that may outline how the characters in the descriptive information are organized or positioned in relation to each other, thereby indicating the representation or structure of the descriptive information. In other words, the schema of representation may indicate how letters, numbers, special characters, and/or spaces are combined to form and represent the descriptive elements.

In response to receiving the data transmission, elementary information corresponding to the resource may be retrieved from a resource inventory database. In one example, the resource inventory database may include elementary information for each resource associated with the network. The elementary information corresponding to each resource may be, in one example, fundamental information about a resource that may be pre-stored in the resource inventory database. In another example, the elementary information corresponding to each resource may be the most recent information about a resource that may be available in the resource inventory database. The elementary information may include elementary resource identifier uniquely identifying each resource and a set of elementary descriptors providing an insight about one or more aspects of each resource. Further, the elementary information, corresponding to each resource, may have an elementary schema of representation. In one example, the elementary schema of representation may indicate how letters, numbers, special characters, and/or spaces are combined to form or represent at least one of the elementary resource identifier and the set of elementary resource descriptors.

Thus, in response to receiving the data transmission, elementary information corresponding to the resource, from which the data transmission was received, is retrieved from the resource inventory database. In one example, the elementary information, available in the resource inventory database, having the elementary resource identifier similar to the resource identifier, received in the data transmission, may be identified and retrieved.

A preliminary assessment may be performed to determine a similarity between schemas of the received descriptive information and the retrieved elementary information. In one example, the preliminary assessment may be performed to determine whether the received descriptive information and the elementary descriptive information, retrieved from the resource inventory database, are represented in similar schemas or formats. In one example, the preliminary assessment may be performed by comparing the schema of representation of the set of descriptive elements with the elementary schema of representation of the set of elementary descriptors associated with the resource and retrieved from the resource inventory database.

Based on the preliminary assessment, it may be ascertained whether a subsequent assessment of similarity between the received descriptive information and the retrieved elementary information may be performed. For example, if it is determined, based on the preliminary assessment, that the schema of representation of the set of descriptive elements is inconsistent with the elementary schema of representation of the set of elementary descriptors, it may be ascertained that further or subsequent assessment is not required to be performed. However, if it is determined that the schema of representation of the set of descriptive elements is consistent with the elementary schema of representation, it may be ascertained that the subsequent assessment may be performed. In other words, if it is determined that the schema of representation, of the set of descriptive elements received in the descriptive information, is the same as compared to the elementary schema of representation, of the set of elementary descriptors, it may be ascertained that both the schemas may be consistent with each other.

Once it is ascertained that the subsequent assessment is to be performed, a similarity may be deduced between the set of descriptive elements and the set of elementary descriptors corresponding to the resource. For example, a firmware version indicated by the set of descriptive elements may be compared with a firmware version indicated by the set of elementary descriptors retrieved from the resource inventory database. In one example, a similarity score may be computed for deducing similarity between the set of descriptive elements and the set of elementary descriptors. Based on the similarity score, it may be ascertained whether the set of descriptive elements has undergone modification as compared to the set of elementary descriptors.

Based on the subsequent assessment, an information-variance signal may be generated to trigger rendering of an indication to indicate the probable modification of the set of descriptive elements in comparison with the set of elementary descriptors corresponding to the at least one resource. In one example, the information-variance signal may trigger rendering of an indication that may convey that the set of descriptive elements may have been modified as compared to the set of elementary descriptors.

The present subject matter may address the problems associated with conventional techniques. According to one example, the present subject matter may perform a first-level assessment, i.e., the preliminary assessment of similarity between schemas of the received descriptive information and the retrieved elementary information. By performing the preliminary assessment, it may be determined whether the schemas are consistent with each other. In case the schemas are identified to be inconsistent, further processing and checking of similarity may be avoided. By identifying schema inconsistencies early in the process, unnecessary utilization of computational resources and processing power are saved by avoiding further processing and similarity checking on incompatible data. Also, avoiding unnecessary processing steps for incompatible data not only optimizes computing resource and processing power utilization to improve overall efficiency but also significantly reduces overall processing time, especially when dealing with large amounts of data.

Further, if the schemas are determined to be consistent, a second-level assessment, i.e., the subsequent assessment may be performed to determine whether the set of descriptive elements is similar or consistent with the set of elementary descriptors corresponding to the resource. Based on the subsequent assessment, the information-variance signal may be generated to trigger rendering of the indication for indicating whether the set of descriptive elements has been modified, in comparison with the set of elementary descriptors available in the resource inventory database.

By performing the two levels of checks, the accuracy of detection of data modification may be improved. For example, unlike the conventional solutions that were prone to false detections or false positives, the present subject matter discloses that the schemas may first be evaluated to prevent such false detection scenarios. That is, evaluation of the similarity between the schemas may assist in the early detection of schema inconsistencies that may, in turn, prevent potential errors or inaccurate results that could occur if inconsistent or mismatched data were processed together. In other words, the preliminary assessment may act as an initial check, ensuring that only data with consistent schemas proceeds to further analysis, thereby considerably reducing false detections that used to occur due to processing of data having inconsistent schemas or representations. As one of the reasons for false positives or detections, in the conventional techniques, is determination that the data has changed while only the representation has changed, the present subject matter may reduce such false positive detections by initial filtering of the data based on consistencies between schemas. Inconsistencies between the schemas may be detected before such data proceeds for further processing as such data may probably be incompatible for comparison due to the schema inconsistencies. The data may only proceed for further processing, such as similarity determinations, upon determining that the schemas of the received descriptive information and the retrieved elementary information are compatible. Therefore, the present subject matter may significantly reduce false detection scenarios. Further, the techniques disclosed by the present subject matter may also allow efficient handling of large data volumes by quickly filtering out incompatible data.

Thus, detecting or identifying such changes may assist in reducing failures, maintaining communication between the resources, and thereby ensuring optimal network performance. Detecting such changes may promptly help the users, for example, network administrators take swift actions to mitigate such potential risks. Further, effective change detection may help meet the compliance requirements and avoid potential legal or financial consequences. Therefore, the present subject matter discloses more sophisticated and efficient techniques for detecting and verifying changes in data being communicated between network elements or resources.

The above techniques are further described with reference to FIGS. 1A to 9. It would be noted that the description and the figures merely illustrate the principles of the present subject matter along with examples described herein and would not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

Figure 1C:
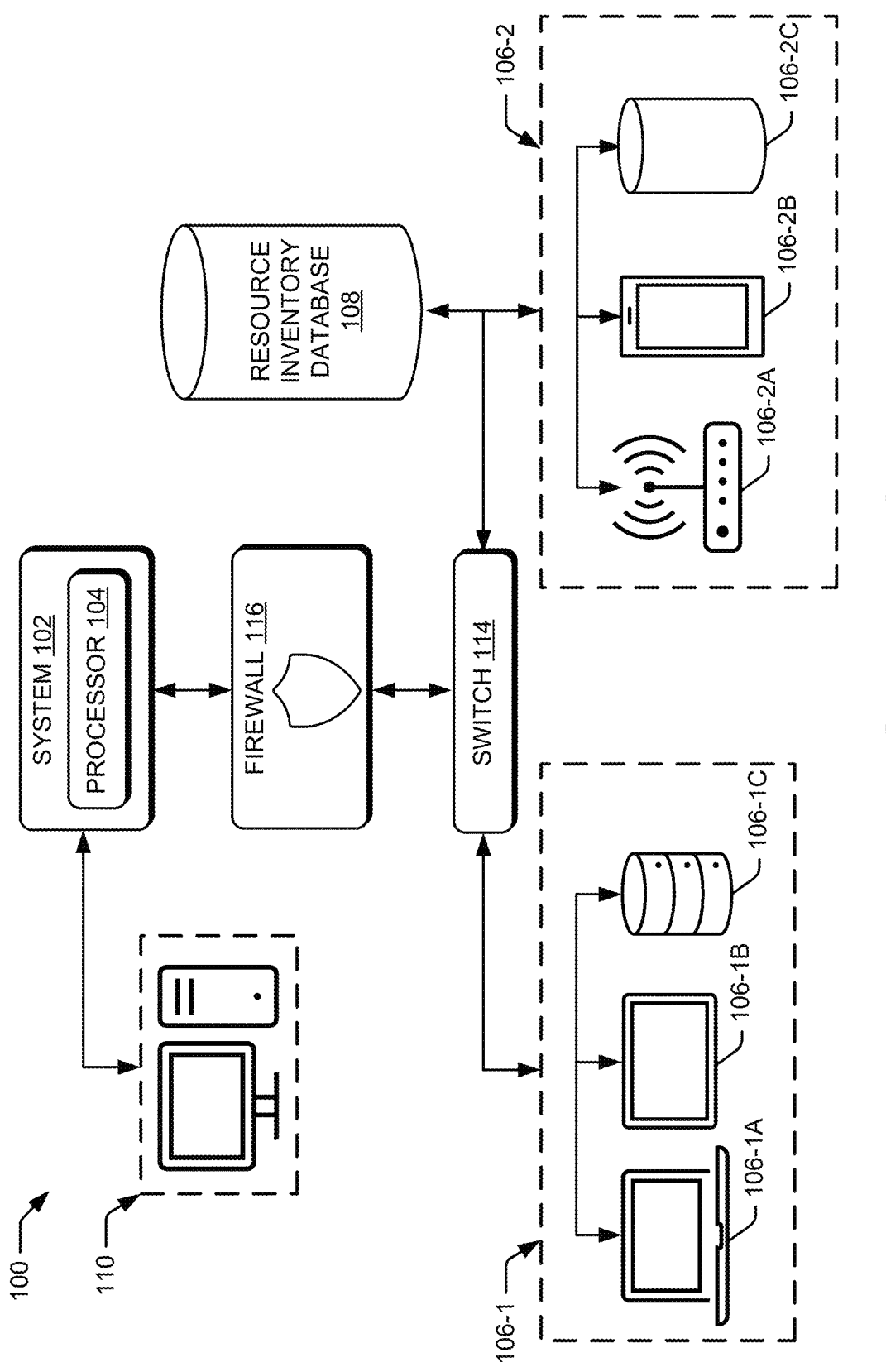

FIGS. 1A to 1C illustrate a block diagram of a computing environment 100, according to an example implementation of the present subject matter. FIGS. 1A to 1C may be discussed in conjunction with each other.

The computing environment 100 may be any computing environment having one or more networks, each having one or more devices or resources associated therewith. The computing environment 100 may be related to, for example, aircraft-related services, finance-related services, e-commerce-related services, cloud-based services, content delivery networks, an organization, a set of one or more individual users, an Internet Service Provider (ISP). Other examples of the computing environment 100 may also be possible.

In one example, the computing environment 100 may include a system 102, having at least a processor 104, for monitoring data and/or signals to be exchanged between the one or more networks, or resources, associated with the computing environment 100. For example, the computing environment 100 may include a network 106-1, as illustrated in FIG. 1A. The system 102 may monitor exchange of data and/or signals between devices or resources associated with the network 106-1. The monitoring may be performed, for example, to detect modification in data and/or signals being exchanged.

In another example, the computing environment 100 may include more than one network, as illustrated in FIGS. 1B and 1C. For example, the computing environment 100 may include the network 106-1 and another network 106-2. The system 102 may be communicably coupled with the network 106-1 and the other network 106-2 for monitoring data and/or signals being exchanged therebetween. The monitoring may be performed, for example, to detect modification in data and/or signals. Similarly, the system 102 may be implemented in any environment where monitoring of data and/or signals may be required. Thus, in one example, the system 102 may monitor, or at least assist in monitoring, exchange of data and/or signals between the networks with which it is communicably coupled. The network 106-1 and the other network 106-2 may hereinafter collectively be referred to as network 106.

In another example, the system 102 could also be implemented in any computing environment to facilitate exchange of data and/or signals between the one one or more networks, or resources associated with the one or more networks. In yet another example, the system 102 could also monitor and control, or at least assist in monitoring and controlling, exchange of data and/or signals between the one one or more networks, or resources associated with the one or more networks, with which it is communicably coupled. Thus, the system 102 may be configured to monitor, facilitate, and/or control transactions between the one one or more networks, or resources associated with the one or more networks.

In one example, the system 102 may be implemented as a set of one or more hardware devices or modules to monitor, facilitate, and/or control exchange of data and/or signals between the one one or more networks, or resources associated with the one or more networks. For example, the system 102 may be implemented as a set of one or more hardware devices, comprising the processor 104. In this example, the set of one or more hardware devices may be communicably coupled with the one or more networks, or resources associated with the one or more networks. Examples of the set of one or more hardware devices may include, but are not limited to, routers, modems, servers, computing systems, switches, gateways, access points, network nodes, and other networking devices.

In another example, the system 102 may be implemented as a set of computer executable instructions that may interact with the data and/or signals being exchanged between the one or more networks, or resources associated with the one or more networks. In this example, the set of computer executable instructions may monitor, facilitate, and/or control exchange of data and/or signals between the one one or more networks, or resources associated with the one or more networks. Examples of the system 102, according to this example, may include, but are not limited to, software applications, firewalls, cloud-based platforms, virtual gateways, security-related software applications, Platform as a Service (PaaS), and Software as a Service (Saas).

In yet another example, the system 102 may be implemented as a combination of the one or more hardware devices and the set of computer executable instructions. In this example, the set of computer executable instructions may be executed by the processor 104 to implement monitoring, facilitating, and/or controlling exchange of data and/or signals between the one one or more networks, or resources associated with the one or more networks. For example, the one or more hardware devices may include the processor 104, configured to execute the set of computer executable instructions, to implement monitoring, facilitating, and/or controlling exchange of data and/or signals. In one example, facilitating and/or controlling of the exchange may be performed based on detection of change in the data, or representation thereof.

Further, the computing environment 100 may include the one or more networks, as discussed above. In one example, the computing environment 100 may include a single network, such as the network 106-1, as illustrated in FIG. 1A. In another example, the computing environment 100 may include multiple networks, such as the network 106-1 and the other network 106-2, as illustrated in FIGS. 1B and 1C.

However, these examples should not be considered as limiting. For example, the network 106-1 and the other network 106-2 may be associated with a same network. In another example, the network 106-1 and the other network 106-2 may be a part of another network. The network 106-1 and the other network 106-2 may be any of Personal Area Network (PAN), Local Area Network (LAN), Metropolitan Area Network (MAN), and Wide Area Network (WAN). In yet another example, the network 106-1 and the other network 106-2 may be a combination of any known type of network, such as PAN, LAN, WAN, and MAN.

Further, each of the one or more networks may include one or more devices or resources. For example, as illustrated in FIG. 1A, the network 106-1 may include a computing device 106-1A, a user device 106-1B, and a server 106-1C. Examples of the computing device 106-1A may include, but are not limited to, a computer system, a laptop, and a workstation associated with a user. The user may be, for example, a network engineer or administrator. Further, examples of the user device 106-1B may include, but are not limited to, a mobile phone, a tablet, a computing system, or any other computing device associated with a user. The user may be, for example, a customer or a consumer of the network 106-1. Further, examples of the server 106-1C may include, but are not limited to, a set of servers or computing devices associated with an organization. Further, the network 106-1, in one example, could include any number and type of devices or resources.

Further, as illustrated in FIGS. 1B and 1C, the network 106-2 may include a networking device 106-2A, a user equipment 106-2B, and a database 106-2C. Examples of the networking device 106-2A may include, but are not limited to, a router, a switch, a gateway, a transceiver, and an access point. Further, examples of the user equipment 106-2B may include, but are not limited to, a mobile phone, a tablet, a computing system, or any other computing device associated with the user. Further, the database 106-2C may include, for example, a set of storage devices capable of storing data and information. The set of storage devices may be virtual storage devices, physical storage devices, or a combination thereof. Further, the network 106-2, in one example, could include any number and type of devices or resources.

The above discussed examples of the resources are only for illustration purposes. Other examples of the resources are also possible. Further, the combination of resources illustrated in each of the networks 106-1 and 106-2 is also for illustration purposes. The one or more networks may include any number of device or resource, and any combination of devices or resources without limiting to the ones disclosed in FIGS. 1A to 1C. The resources may include, but are not limited to, computing devices and networking devices capable of generating and/or exchanging data and/or signals.

In one example, each of the resources associated with the one or more networks may have elementary information associated therewith. The elementary information corresponding to each resource may be, in one example, a fundamental information about the resource. In another example, the elementary information corresponding to each resource may be a most recent or updated information about a resource. For example, the elementary information corresponding to each resource may be an information most recently derived, or manually received, based on the data and/or signals being exchanged by the resource. The elementary information may include, in one example, elementary resource identifier uniquely identifying each resource and a set of elementary descriptors providing an insight about one or more aspects of each resource.

Examples of the elementary resource identifier may include, for example, Internet Protocol (IP) address, MAC address, International Mobile Equipment Identity (IMEI) number, an optical code, a serial number, and a manually assigned resource ID that may uniquely identify each resource. Further, examples of the set of elementary descriptors may include, but are not limited to, resource name, a firmware version, a software version, resource description, manufacturing details, storage space, type of the resource, operational status of the resource, information indicating a network with which the resource is associated, and any other information manually provided or associated with the resource.

Further, the elementary information, corresponding to each resource, may have an elementary schema of representation. In one example, the elementary schema of representation may indicate how letters, numbers, special characters, and/or spaces are arranged to form or represent the elementary resource identifier and the set of elementary descriptors. Thus, the elementary schema of representation may outline how these elements are arranged and used to represent the elementary resource identifier and the set of elementary descriptors. In other words, the elementary schema of representation may be the format, pattern, or structure in which the elementary resource identifier and the set of elementary descriptors are represented.

In one example, the elementary information, corresponding to each resource, may be stored in a resource inventory database 108. The computing environment 100, in one example, may include the resource inventory database 108 that may be communicably coupled with the system 102. The resource inventory database 108 may include, for example, a set of storage devices capable of storing data and information. The set of storage devices may be virtual storage devices, physical storage devices, a cloud-based storage service, or a combination thereof. For example, the resource inventory database 108 may be any repository or storage unit implemented by physical, logical, and/or virtual storage devices. In one example, the resource inventory database 108 may include a set of physical storage devices. In another example, the resource inventory database 108 may include virtual stage devices being implemented on physical storage devices. In another example, the resource inventory database 108 may include one or more physical or logical storage units that may either be located at the same location or distributed geographically. In another example, the resource inventory database 108 may be implemented over a cloud-based storage service.

Thus, the resource inventory database 108 may store the elementary information corresponding to resource associated with the one or more networks. Further, the elementary resource identifier and the set of elementary descriptors may have the elementary schema of representation. FIG. 2 illustrates a database 200 having the elementary information corresponding to each resource associated with the one or more networks, according to one example implementation of the present subject matter. The database 200 may be stored in the resource inventory database 108. The database 200 illustrates the elementary schema, according to one example. For example, the database 200 illustrates that the format or structure in which the MAC address, the operational status, and the firmware version associated with the computing device 106-1A may be represented. Similarly, the database 200 illustrates the format or structure in which the elementary resource identifier and the set of elementary descriptors may be represented. The format or structure in which the elementary resource identifier and the set of elementary descriptors may be represented in the database 200, may be referred to as the elementary schema of representation. Similarly, the database 200 may include the elementary information for each of the resource(s) associated with the one or more networks, where the elementary information includes the elementary resource identifier and the set of elementary descriptors having a corresponding elementary schema of representation.

Thus, in one example, the elementary information, corresponding to each resource associated with the one or more networks for which the system 102 is to monitor, control, and/or detect modification in data and/or signals, may be available in the resource inventory database 108. In one example, while setting up the one or more networks, such as networks 106-1 and/or 106-2, the elementary information, corresponding to each resource associated with the one or more networks, may be fed or stored in the resource inventory database 108. In one example, the elementary information may be provided by a user. In one example, the user may be a network engineer or administrator and the elementary information may be received through a workstation 110, communicably coupled with the system 102 and as illustrated in FIG. 1C, associated with the network engineer or administrator. The workstation 110 may also be used for multiple other purposes. For example, the workstation 110 may be used for configuring the resources associated with the one or more networks, such as the networks 106-1 and 106-2. The workstation 110 may be used to logically add or remove the resources from the one or more networks. The workstation 110 could also be used to modify the elementary information stored in the resource inventory database 108. In one example, the workstation 110 could also be a part of the one or more networks, though not illustrated. In one example, the workstation 110 could be associated with a user and may enable the user to modify the one or more networks or the elementary information corresponding to each resource of the one or more networks.

Further, as illustrated by way of an example in FIG. 1A, the one or more resources associated with the network 106-1 may be communicably coupled with the system 102. The coupling, for example, may be wired or wireless. In another example, the coupling may be though another network. For example, the system 102 may be remotely located and may be communicably coupled with the network 106-1 over a communication network 112.

In one example, the system 102 may be communicably coupled with multiple networks, as discussed above. As illustrated by way of an example in FIGS. 1B and 1C, the system may be communicably coupled with the networks 106-1 and 106-2. The coupling may be, for example, wired or wireless. In another example, the coupling may be through the communication network 112. The system 102 and the networks 106-1 and 106-2 may exchange data, signals and/or instructions through the communication network 112. For instance, the system 102 and the networks 106-1 and 106-2 may be distributed across different locations and/or platforms and may be communicably coupled over the communication network 112 to assist in inter-communications and exchange of data, instructions, and signals. Examples of the communication network 112 may include, but are not limited to LAN, WAN, the internet, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network 112 may include various network entities, such as transceivers, gateways, and routers. In an example, the communication network 112 may include any communication network that uses any of the commonly used protocols, for example, Hypertext Transfer Protocol (HTTP), and Transmission Control Protocol/Internet Protocol (TCP/IP).

Further, in one example, the system 102, the network 106-1, and the network 106-2 may be communicably coupled with each other using a networking device, for instance, a switch 114. The switch 114 may facilitate exchange of data and/or signals between the system 102, the network 106-1, and the network 106-2 may be communicably coupled with each other using a switch 114

Further, in one example, the computing environment 100 may include a network security device communicably couples with the system 102, the network 106-1, and the network 106-2. The network security device, in one example, may be a firewall 116 that may monitor the data and/or signals being exchanged between the system 102, the network 106-1, and the network 106-2. The firewall 116, in one example, may decide whether to allow or block communication of the data and/or signals from either of the system 102, the network 106-1, or the network 106-2. In one example, the system 102 may itself act as the firewall 116. In this example, the computing environment 100 may not include the additional firewall 116. In another example, the system 102 may be implemented at the firewall 116.

Further, though illustrated that the one or more networks are communicably coupled with the system 102 and are external to the system 102, other architectures and implementations may also be possible. In one example, the one or more networks may be a part of the system 102. In another example, the system 102 may include the one or more networks communicably coupled with each other. In this example, the resources associated with each of the one or more networks may be communicably coupled with the each other via the processor 104 of the system 102.

Different architectures and examples have been discussed above. However, such examples and illustrations are not to be considered as limiting in. Other obvious architectures may also be possible where at least one network, having at least one resource, may be communicably connected to exchange data and/or signals.

Figure 3:
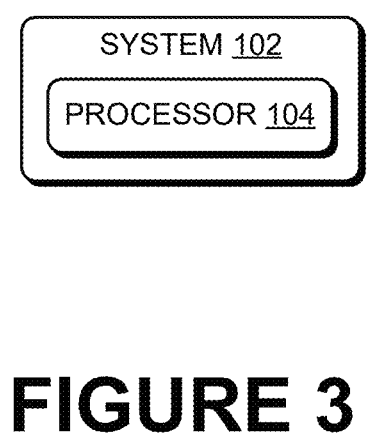

FIG. 3 illustrates a block diagram of the system 102, according to one example implementation of the present subject matter. FIG. 3 will be discussed in conjunction with FIGS. 1A to 2. In one example, the system 102, having the processor 104, may monitor data and/or signals to detect modification therein.

In one example operation, the processor 104 may receive a data transmission from at least one resource from amongst a set of resources. The at least one resource may be, for example, any resource, as illustrated in FIGS. 1A to 1C. The data transmission may include, in one example, descriptive information associated with the resource, say the networking device 106-2A. In one example, the descriptive information may indicate at least one of a resource identifier that may uniquely identify the resource and a set of descriptive elements that may provide an insight about one or more aspects related to the resource. The resource identifier may be, for example, MAC address associated with the resource. The one or more aspects, indicated by the set of descriptive elements, may be, for example, operational status of the resource, vendor of the resource, a firmware version, a software version, or other information that may provide additional details about the resource. The other information may indicate, for example, name of resource type, resource description, and Operating System (OS) details.

Further, in one example, the set of descriptive elements may have a schema of representation. In one example, the schema of representation may be a format or structure in which the set of descriptive elements is being represented in the received data transmission or the descriptive information. For example, the schema of representation may indicate the structure or arrangement of alphabets, numbers, special characters, and/or spaces in the set of descriptive elements.

In response to receiving the data transmission, the processor 104 may retrieve elementary information corresponding to the resource. As discussed above, the resource inventory database 108 may include elementary information for each resource associated with the one or more networks. In one example, the processor 104 may access the resource inventory database 108 to retrieve the elementary information corresponding to the at least one resource, say the networking device 106-2A from which the data transmission originated or was received. The elementary information corresponding to the at least one resource may be, in one example, a fundamental information about the at least one resource that may be pre-stored in the resource inventory database 108, as discussed above, and at least before reception of the data transmission. The elementary information may include elementary resource identifier uniquely identifying the at least one resource and a set of elementary descriptors providing an insight about one or more aspects of the at least one resource.

In one example, the elementary information and the descriptive information may be similar in characteristics. For example, the elementary information may include the elementary resource identifier and the set of elementary descriptors corresponding to the at least one resource, whereas the descriptive information may include the resource identifier and the set of descriptive elements related to the at least one resource. Thus, the elementary information and the descriptive information may have similar characteristics of information with respect to the at least one resource. Further, since the elementary information and the descriptive information may be related to the same resource, and the elementary information may be available prior to receiving the descriptive information, the elementary information may thus be an instance of the descriptive information available in the resource inventory database 108 prior to reception of the data transmission from the at least one resource. That is, the elementary information may be a version of the descriptive information that may be available in the resource inventory database 108 prior to reception of the data transmission from the at least one resource.

Further, the set of elementary descriptors may have the elementary schema of representation. In one example, the elementary schema of representation may indicate how letters, numbers, special characters, and/or spaces are arranged to represent or structure the set of elementary resource descriptors. Thus, upon receiving the data transmission, the processor 104 may retrieve the elementary information corresponding to the at least one resource from which the data transmission was received.

The processor 104 may then perform a preliminary assessment of similarity between the schemas of the received descriptive information and the retrieved elementary information. In one example, the processor 104 may perform the preliminary assessment by comparing the schema of representation of the set of descriptive elements and the elementary schema of representation of the set of elementary descriptors associated with the at least one resource.

Based on the preliminary assessment, that processor 104 may ascertain whether to perform a subsequent assessment of similarity between the received descriptive information and the retrieved elementary information. For example, if the processor 104 determines, based on the preliminary assessment, that the schema of representation of the set of descriptive elements is inconsistent with the elementary schema of representation of the set of elementary descriptors, the processor 104 may ascertain that the subsequent assessment may not be required to be performed. However, if the processor 104 determines that the schema of representation of the set of descriptive elements is consistent with the elementary schema of representation, the processor 104 may ascertain that the subsequent assessment may be required.

Once the processor 104 ascertains that the subsequent assessment is required to be performed, the processor 104 may perform the subsequent assessment by deducing a similarity between the set of descriptive elements and the set of elementary descriptors corresponding to the at least one resource. For example, resource description indicated by the set of descriptive elements may be compared with the resource description indicated by the set of elementary descriptors retrieved from the resource inventory database 108.

Based on the subsequent assessment, the processor 104 may generate an information-variance signal to trigger rendering of an indication to indicate a probable modification of the set of descriptive elements in comparison with the set of elementary descriptors corresponding to the at least one resource. In one example, the indication may indicate that the set of descriptive elements may have undergone modification and are at least partially different than the set of elementary descriptors corresponding to the at least one resource available in the resource inventory database 108.

Figure 4:
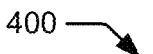
FIG. 4 illustrates a computing environment comprising the system, according to another example implementation of the present subject matter.

FIG. 4 illustrates a computing environment 400 comprising the system 102, according to another example implementation of the present subject matter. FIG. 4 will be discussed in conjunction with FIGS. 1A to 1C.

In one example, the computing environment 400 may be similar to the computing environment 100 discussed with reference to FIGS. 1A to 1C. The computing environment 400 may be any computing environment including the system 102 and the set of resources. In one example, the computing environment 400 may also include the resource inventory database 108. Further, the computing environment 400 may include the one or more networks, such as the network 106-1, the other network 106-2, . . . , and/or a Nth network 106-N, where N is a natural number. Similar to the networks 106-1 and 106-2, the Nth network 106-N may also include a set of devices or resources. The computing environment 400 may thus be a network of such entities that may be communicably coupled with each other, for example, over the communication network 112.

The computing environment 100 may include the system 102 configured for detecting modification(s) in data and/or signals by analyzing the data and/or signals exchanged between the resources associated with the one or more networks. In one example, the system 102 may monitor the data and/or signals to detect modifications therein. For example, the data and or signals may originate from a resource and may be routed or communicated to another resource through the system 102. The system 102 may then determine whether the data and/or signals have undergone modification. In another example, the data and/or signals may not be exchanged between the resources. Instead, the data and/or signals may be received by the system 102 in response to a request made by the system 102 to the one or more resources. For example, the system 102 may communicate with the one or more resources either regularly or at predefined intervals to determine whether the descriptive information associated with the one or more resources has probably undergone any modification. Thus, the system 102 may function, in one example, as a data modification detector that may detect whether the descriptive information associated with the one or more resources has probably undergone any modification. The descriptive information may interchangeably referred to as data, signal, or data and/or signal.

In one example, the system 102 may include the processor 104 that may be configured to monitor and detect modifications in the data and/or signals received from the one or more resources. The processor 104 may be implemented as a dedicated processor, a shared processor, or a plurality of individual processors, some of which may be shared. Examples of the processor 104 may include, but are not limited to, microprocessors, microcomputers, microcontrollers, digital signal processors, central processing units, state machines, Artificial Intelligence (AI) based processors, machine learning-based processors, deep learning-based processors, system on chip (SOC), processing circuitries including one or more modules or engines, and/or any other devices that manipulate signals and data based on computer-readable instructions, and/or any other devices.

The system 102 may further include, in one example, interface(s) 402 that may allow communicably coupling the system 102, and/or the processor 104, with one or more other entities, such as the networks 106-1, 106-2, . . . , and 106-N, the resource inventory database 108, the workstation 110, the switch 114, the firewall 116, and/or the communication network 112. The connection or coupling may be through a wired connection or a wireless connection. In one example, the interface(s) 402 may include one or more ports that may enable communicable coupled of the system with the one or more other entities.

In one example, the system 102 may further include other unit(s) 406. The other unit(s) 406 may include, in one example, a power supply unit and a communication unit. The power supply unit may, for example, manage distribution or supply of electrical current within the system 102 for functioning of the system 102. Further, the communication unit may be, in one example, a wireless communication unit. t. Examples of the communication unit may include, but are not limited to, Global System for Mobile communication (GSM) modules, Code-division multiple access (CDMA) modules, Bluetooth modules, network interface cards (NIC), Wi-Fi modules, dial-up modules, Integrated Services Digital Network (ISDN) modules, Digital Subscriber Line (DSL) modules, and cable modules. In one example, the communication unit may also include one or more antennas to enable wireless transmission and reception of data and signals. The communication unit may allow the system 102 to be communicably coupled with the networks 106-1, 106-2, . . . , and 106-N, the resource inventory database 108, the workstation 110, the switch 114, the firewall 116, and/or the communication network 112. Also, the communication unit may allow the system 102 to transmit and receive data and signals.

In one example operation, the processor 104 may receive a data transmission from at least one resource from amongst a set of resources. The set of resources may be the resources associated with any of the networks 106-1, 106-2, . . . , and 106-N, and the data transmission may be received by the processor 104, or a data reception unit 408 of the processor, from at least one resource from amongst the set of resource. In one example, the data transmission may originate from the at least one resource and may be routed or communicated to the system 102. In another example, the data transmission may be received by the system 102 in response to a request made by the system 102 to the at least one resource. For example, the system 102 may communicate with the at least one resource either regularly or at predefined intervals to determine whether the descriptive information associated with the at least one resource has probably undergone any modification. In one example, the user, such as the network administrator or engineer may define the intervals at which the processor 104 may communicate with the at least one resource to receive the data transmission from the at least one resource. In one example, the intervals may be defined and modified through the workstation 110. In another example, the intervals could also be defined through any of the resources.

In yet another example, the processor 104 may receive the data transmission when the at least one resource sends the data transmission for another resource. In this example, the processor 104 may be communicably coupled with the data path that the data transmission may follow in order to reach the other resource. In yet another example, when the at least one resource transmits or sends the data transmission for the other resource, the data transmission may be channeled through the processor 104. Similarly, other scenarios may also be possible that may cause generation of the data transmission by the at least one resource, and where the data transmission may be communicated to the processor 104.

In one example, the data transmission may include descriptive information 410. In another example, the data transmission may include other information or signal that the at least one resource intends to, or is configured to, transmit. In this example, the descriptive information 410 may be shared as metadata along with the information or the signal. Thus, the processor 104 may receive the data transmission from the at least one resource, and the data transmission may include at least the descriptive information 410 associated with the at least one resource. For example, the data transmission may originate from the user device 106-1B and may be received by the processor 104, or the data reception unit 408.

Figure 5:
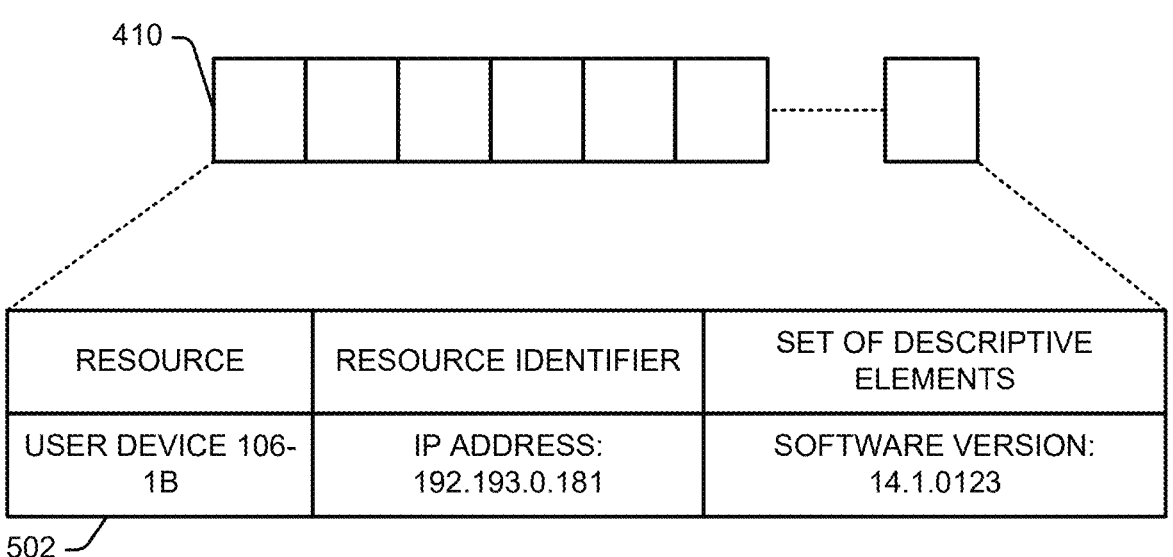
FIG. 5 illustrates descriptive information in form of data packets, according to one example implementation of the present subject matter.

In one example, the descriptive information 410 may be in form of data packets, as illustrated in FIG. 5. FIG. 5 illustrates the descriptive information 410 in form of data packets, according to one example implementation of the present subject matter.

The descriptive information 410 may indicate, in one example, at least one of the resource identifier that may uniquely identify the at least one resource, say the user device 106-1B, and the set of descriptive elements, as illustrated in Table 502 in FIG. 5. In one example, the processor 104, or a data processing unit 412, may decode the received data transmission to derive the descriptive information 410. Thus, the processor 104 may determine, from the received data transmission having the descriptive information 410, the resource identifier of the at least one resource from which the data transmission originated. The resource identifier may be, for example, IP address, MAC address, or IMEI number associated with the at least one resource from whom the data transmission was received. Other examples of the resource identifiers may also be possible, though not illustrated, that may uniquely identify the at least one resource.

Further, the set of descriptive elements may provide an insight about one or more aspects related to the at least one resource. For example the set of descriptive elements may indicate the software version of the user device 106-1B, as illustrated in Table 502. Other examples of the one or more aspects may also be possible. For example, the one or more aspects may be operational status of the at least one resource, vendor name of the at least one resource, the firmware version, resource type, resource description, OS details, or other information that may provide additional details about the at least one resource.

Further, in one example, the set of descriptive elements may have a schema of representation, as illustrated in Table 502. In one example, the schema of representation may be a format or structure in which the set of descriptive elements are represented in the received data transmission or the descriptive information 410. For example, the schema of representation may indicate the structure or arrangement of alphabets, numbers, special characters, and/or spaces in the set of descriptive elements. As illustrated in Table 502, as one example, arrangement of the numbers and "." may indicate the schema of representation of the set of descriptive elements, for instance, the software version of the at least one resource. Similarly, in one example, the resource identifier may also have a schema of representation. As illustrated in Table 502, as one example, arrangement of the numbers and "." may indicate the schema of representation of the resource idenitfier, for instance, the IP address of the at least one resource.

Further, the processor 104, or the data processing unit 412, may retrieve elementary information corresponding to the at least one resource. In one example, the processor 104 may access the resource inventory database 108 in response to receiving the data transmission originated from the at least one resource. In one example, the resource inventory database 108 may be communicably coupled with the processor 104. Further, the resource inventory database 108, as discussed above, may store the elementary information corresponding to each resource in the set of resources that may be associated with the one or more networks. The elementary information, in one example, may include the elementary resource identifier uniquely identifying each resource in the set of resources. The elementary information may further include the set of elementary descriptors associated with each resource in the set of resources. The set of elementary descriptors may provide an insight about the one or more aspects related to each resource in the set of resources. As discussed above, the resource inventory database 108 may be preconfigured with the elementary information associated with each resource in the set of resources. In one example, the preconfiguring may be done by a network administrator using the workstation 110. In one example, the resource inventory database 108 may store the elementary information corresponding to each resource in the set of resources in an indexed manner. The indexation may be, for example, based on the elementary resource identifier, and each elementary resource identifier may have linked therewith the set of elementary descriptors corresponding to the resource with which the elementary resource identifier is associated.

To retrieve the elementary information corresponding to the at least one resource, the processor 104 may, in one example, access the elementary information corresponding to each resource in the set of resources. The processor 104 may, for example, search across the elementary information, corresponding to each resource in the set of resources, stored in the resource inventory database 108. In one example, the processor 104 may search for the required elementary information based on the resource identifier indicated by the descriptive information 410. The processor 104 may compare the resource identifier with the elementary resource identifiers, corresponding to each resource in the set of resources, stored in the resource inventory database 108. Based on the comparison, the processor 104 may identify the elementary resource identifier corresponding to the resource identifier that was indicated by the descriptive information 410. Thus, the processor 104 may identify and retrieve the elementary information, from the resource inventory database 108, having the elementary resource identifier similar to the resource identifier received in the data transmission.

Further, as discussed above, the elementary information may have the elementary schema of representation. The database 200 illustrates the elementary schema, according to one example. For example, the database 200 illustrates that the format or structure in which the elementary resource identifier, such as the IP address may be represented. Similarly, the database 200 illustrates the format or structure in which the set of elementary descriptors, such as the software version, may be represented. The format or structure in which the elementary resource identifier and the set of elementary descriptors may be represented, may be referred to as the elementary schema of representation.

Further, the elementary information, such as the retrieved elementary information, may be an instance of the received descriptive information 410. As discussed above in one example, the elementary information and the descriptive information 410 may share similar characteristics. For example, the elementary information may comprise the elementary resource identifier and the set of elementary descriptors corresponding to the at least one resource. Similarly, the descriptive information 410 may include the resource identifier and the set of descriptive elements related to the at least one resource. Both types of information may therefore possess comparable attributes with respect to the at least one resource.

Given that the elementary information and descriptive information 410 may pertain to the same resource, and the elementary information may be available before the descriptive information 410 is received, the elementary information may be considered an earlier instance of the descriptive information 410 which is already stored in the resource inventory database 108. In essence, the elementary information may represent a preliminary version of the descriptive information 410 present in the resource inventory database 108 prior to the reception of the data transmission from the at least one resource.

In other words, the elementary information and the descriptive information 410 may share similar characteristics. However, a key distinction lies in their timing and availability. The elementary information may be viewed as an initial or preliminary instance of information about the at least one resource, available in the resource inventory database 108 before the data transmission is received from the at least one resource. This early instance may contain details about the at least one resource. In contrast, the descriptive information 410 represents a potentially more recent instance of information about the same resource. This instance may typically received later, through the data transmission from the at least one resource. Thus, the elementary information serves as an early instance of resource information, while the descriptive information 410 provides a subsequent, potentially more recent or current instance of information about the same resource. Thus, the elementary information may be an instance of the descriptive information 410 and may be available in the resource inventory database 108 prior to reception of the data transmission from the at least one resource. That is, the elementary information, in one example, may be a version of the descriptive information 410 itself and may be available in the resource inventory database 108 prior to reception of the data transmission from the at least one resource.

The processor 104, or the data processing unit 412, may then perform a preliminary assessment of similarity between the schemas of the received descriptive information 410 and the retrieved elementary information. In one example, the processor 104 may perform the preliminary assessment by comparing the schema of representation of the set of descriptive elements and the elementary schema of representation of the set of elementary descriptors associated with the at least one resource.

The processor 104 may utilize or perform any known technique for comparing the schemas. For example, the processor 104, or the data processing unit 412, may be configured to analyze and contrast the structural representations of the set of descriptive elements and the elementary schema of representation to identify similarities and differences between the schemas. The schemas of the set of descriptive elements and the elementary schema of representation may be dissected or parsed to identify key structural elements or to determine features indicated by the schemas. These may include, but are not limited to, identification of arrangement or placement of alphabets, numbers, special characters, spaces, and punctuations. By identifying the arrangement or placement, the processor 104 may ascertain whether the schemas are similar. For example, for the set of elementary descriptors indicating the software version "14.1.0123", the processor 104 may determine placement of each character or sequence of appearance of each character including the text, punctuations, and spaces. Similarly, for the set of descriptive elements indicating the software version "14.1.0123", the processor 104 may determine placement of each character or sequence of appearance of each character. That is, the processor 104 may determine which character appears in which sequence in the set of elementary descriptors and the set of descriptive elements.

In one example, the processor 104 may use algorithms to compare the schemas. For example, the processor 104 may use sequence matching algorithms, such as Long Common Subsequence (LCS), to compare the order and structure of contents in the set of descriptive elements and the elementary schema of representation, for identifying sequences and differences. In another example, the processor 104 may use feature extraction algorithms to determine the features and structure of the schemas, and similarity therebetween. In yet another example, the processor 104 may perform pattern matching to determine the similarity between the schemas.

Figure 6:
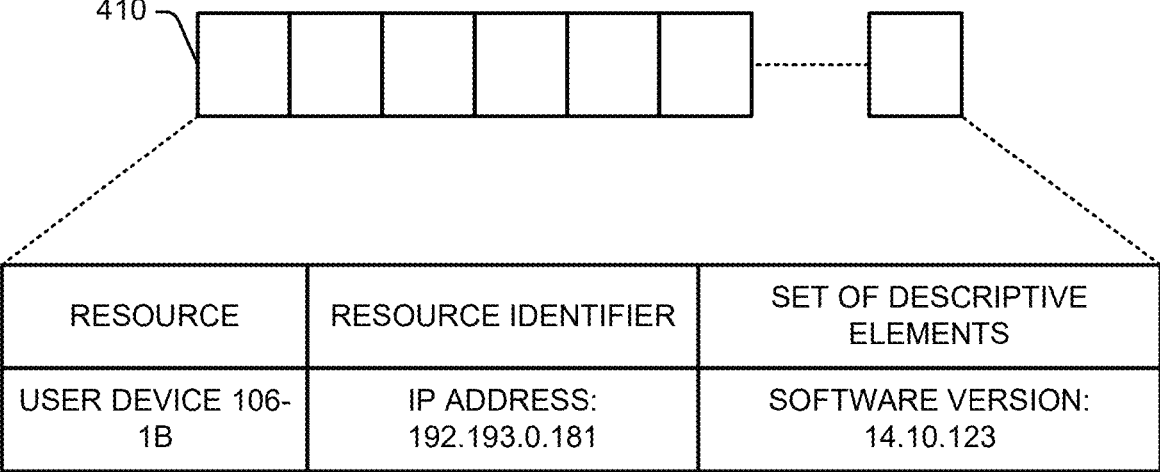
FIG. 6 illustrates the descriptive information having a set of descriptive elements with different schema of representation as compared to elementary schema of representation of a set of elementary descriptors, according to one example implementation of the present subject matter.

Based on the determinations of placements or sequences of texts, punctuations, and spaces, the processor 104 may ascertain whether the schemas are similar. For example, if the processor 104 determines that the set of elementary descriptors indicates the software version as "14.1.0123" and the set of descriptive elements indicates the software version as "14.1.0123", the processor 104 may ascertain that placement of characters, including texts, punctuations, and spaces is similar. The processor 104 may thus ascertain that the schemas may probably be consistent with respect to each other. However, if the processor 104 determines that the set of elementary descriptors indicates the software version as "14.1.0123" and the set of descriptive elements indicates the software version as "14.10.123", the processor 104 may ascertain that placement of characters, such as punctuations ("."") is not similar to the one indicated in the elementary schema of representation. The processor 104 may thus ascertain that the schemas may probably be inconsistent with respect to each other. FIG. 6 illustrates the descriptive information 410 having the set of descriptive elements with different schema of representation as compared to the elementary schema of representation of the set of elementary descriptors, according to one example implementation of the present subject matter. Similarly, in one example, the processor 104 may also compare the schema of representation of the resource identifier and the elementary schema of representation of the elementary resource identifier to assess a similarity therebetween.

Further, if the processor 104 ascertains that the schemas are not similar, the processor 104 may abort further assessment(s) for the descriptive information that was received in the data transmission. In this case, the processor 104 may scan or await for further data transmissions from any of the resources in the set of resources. Thus, the performance or execution of further processing or assessments may be prevented for such incompatible data.

In another example, the processor 104 may ascertain to update the elementary information with such descriptive information. For example, if the processor 104 determines that the modification in schema of the descriptive information was authorized, for instance, by the network administrator via the workstation 110, or by using any other resource, the processor 104 may ascertain to modify the elementary information by updating the elementary schema of representation based on the schema of representation of the descriptive information. In one example, the data transmission or the descriptive information may include an authorization indication that may indicate whether the modification is an authorized modification. Thus, in such a case, if the processor 104 determines, based on the preliminary assessment, that the schema of representation is inconsistent with the elementary schema of representation, the processor 104 may generate a schema modification signal to trigger modification of the elementary schema of representation, available in the resource inventory database 108, based on the schema of representation indicated by the descriptive information.

However, if the processor 104 determines, based on the preliminary assessment, that the schema of representation is consistent with the elementary schema of representation, the processor 104 may ascertain to perform a subsequent assessment.

Thus, based on the preliminary assessment, the processor 104 may ascertain whether to perform a subsequent assessment of similarity between the received descriptive information and the retrieved elementary information. For example, if the processor 104 determines, based on the preliminary assessment, that the schema of representation of the set of descriptive elements is inconsistent with the elementary schema of representation of the set of elementary descriptors, the processor 104 may ascertain that the subsequent assessment may not be required to be performed. However, if the processor 104 determines that the schema of representation of the set of descriptive elements is consistent with the elementary schema of representation, the processor 104 may ascertain that the subsequent assessment may be required. In one example, the result of the preliminary assessment may be binary. For example, if the schemas are determined to be same, the result may be 1, "TRUE", and the like, indicating that the subsequent assessment should be preformed. Whereas, if the schemas are determined to be distinct, the result may be 0, "false", and the like, indicating that performance of the subsequent assessment may be aborted or restricted.

Once the processor 104 ascertains that the subsequent assessment is required, the processor 104 may initiate performing the subsequent assessment. In one example, the processor 104 may perform the subsequent assessment by deducing a similarity between the set of descriptive elements and the set of elementary descriptors corresponding to the at least one resource. To deduce the similarity, the processor 104 may, in one example, parse the set of descriptive elements and the set of elementary descriptors corresponding to the at least one resource. The processor 104 may employ a combination of syntactic, semantic, and statistical analysis to deduce the similarity between the set of descriptive elements and the set of elementary descriptors. For example, the processor 104 may assess syntactic similarity by comparing features of the texts, such as structural features, and phrase patterns in the set of descriptive elements and the set of elementary descriptors.

The processor 104 may also determine semantic similarity by analyzing the meaning and context of the content in the set of descriptive elements and the set of elementary descriptors. For example, the processor may use Natural Language Processing (NPL) techniques or Large Language Models (LLMs) to identify analogus concepts. The processor 104 may also utilize statistical methods, such as cosine similarity or Jaccard index to measure overlap between the content present in the set of descriptive elements and the set of elementary descriptors.

In one example, the processor 104 may use advanced techniques to deduce the similarity. For example, the processor 104 may have one or more models or machine learning algorithms deployed thereon that may capture similarities between the content present in the set of descriptive elements and the set of elementary descriptors. By integrating the above-discussed techniques, the processor 104 may be able to perform a comprehensive and accurate assessment of similarity, enabling precise comparison between the set of descriptive elements and the set of elementary descriptors.

In another example, the processor 104 may encode each character present in the set of descriptive elements and the set of elementary descriptors into their corresponding American Standard Code for Information Interchange (ASCII) equivalent. The processor 104 may then, in one example, compute a similarity score by comparing the ASCII equivalents. For example, the processor 104 may compare the ASCII equivalent of the first character in the software version (say "1", as illustrated in FIGS. 5 and 6) indicated by the set of descriptive elements with the ASCII equivalent of the first character in the software version (say "1", as illustrated in FIG. 2) indicated by the set of elementary descriptors. Similarly, the processor 104 may compare the ASCII equivalents for each character in the set of descriptive elements and the set of elementary descriptors to deduce the similarity therebetween, to deduce the similarity between the set of descriptive elements and the set of elementary descriptors.

In yet another example, the processor 104 may encode the content present in the set of descriptive elements and the set of elementary descriptors into vector forms. For example, the processor 104 may utilize NLP or trained LLMs to encode the content present in the set of descriptive elements and the set of elementary descriptors into vectors. In one example, the vectors may be numerical numerical vectors. That is, the processor may derive a first set of vectors for the content present in the set of descriptive elements and a second set of vectors for the content present in the set of elementary vectors. For example, the software version indicated by the set of descriptive elements and by the set of elementary descriptors may be converted into a first and a second set of vectors, respectively.

In one example, the result of the subsequent assessment may be binary. For example, if it is determined that there is similarity between the set of descriptive elements and the set of elementary descriptors corresponding to the at least one resource, the result may be 1, "TRUE", and the like. Whereas, if it is determined that the set of descriptive elements and the set of elementary descriptors are distinct, the result may be 0, "false", and the like. Thus, a clear decision may be derived.

In another example, the result of the subsequent assessment may be a score-based result. In example, the processor 104 may compute a similarity score by comparing the first and the second set of vectors. For example, the vector associated with the first character in the software version (say "1", as illustrated in FIGS. 5 and 6) indicated by the set of descriptive elements may be compared with the first character in the software version (say "1", as illustrated in FIG. 2) indicated by the set of elementary descriptors. Similarly, the processor 104 may compare the vectors for each character in the set of descriptive elements and the set of elementary descriptors to deduce the similarity therebetween.

Based on the similarity of vectors, the processor 104 may compute the similarity score. The similarity score may quantify an extent of similarity between the set of descriptive elements and the set of elementary descriptors corresponding to the at least one resource. For example, more will be the similarity between the vectors, the higher the similarity score would be. Once the similarity score has been computed, for each character by comparing the corresponding vectors, the processor 104 may then compare the computed similarity score with a threshold similarity score. In one example, the threshold similarity score may be a numerical value. The threshold similarity score may be defined, for example, by the network administrator via the workstation 110.

Based on the comparison, the processor 104 may ascertain whether the set of descriptive elements and the set of elementary descriptors are similar. For example, if the similarity score is greater than or equal to the threshold similarity score, the processor 104 may ascertain that content of the set of descriptive elements and the set of elementary descriptors is similar. However, if the similarity score is less than the threshold similarity score, the processor 104 may ascertain that the content of the set of descriptive elements and the set of elementary descriptors is different. That is, the set of descriptive elements may have been modified as compared to the set of elementary descriptors.

Based on the subsequent assessment, the processor 104, or a signal generation unit 414, may generate an information-variance signal to trigger rendering of an indication to indicate a probable modification of the set of descriptive elements in comparison with the set of elementary descriptors corresponding to the at least one resource. For example, upon determination of modification, the processor 104 may generate the information-variance signal. In one example, the information-variance signal may be a set of instructions that may cause the rendering of the indication. For example, the information-variance signal may be communicated through the communication network 112 to the workstation 110 to trigger the rendering of the indication. In another example, the signal may be communicated through the communication network 112 to any of the one or more resources associated with any of the networks 106-1, 106-2, . . . , and 106-N. In one example, the indication may convey that the set of descriptive elements may have undergone modification and are at least partially different than the set of elementary descriptors, corresponding to the at least one resource, available in the resource inventory database 108. The indication may be at least one of an audio indication and a visual indication for indicating the probable modification of the set of descriptive elements. In one example, the information-variance signal may cause the generation of at least one of the audio indication and the visual indication.

In one example, the processor 104 may cause rendering of at least one interactive interface for rendering the indication. For example, the interactive interface may be rendered on the workstation 110, or any of the resources, upon reception of the information-variance signal. the interactive inforface may be, in one example a Graphical User Interface (GUI) based interface that may be capable of rendering the indication.

The indication may be, for instance, a text box including textual information indicating that the set of descriptive elements may probably have been modified. Further, in one example, the audio indication may be a speech indication to convey that the set of descriptive elements may probably have been modified.

However, in case the processor 104 determines that the set of descriptive elements are similar or consistent as compared to the set of elementary descriptors, the processor 104 may ascertain that the set of descriptive elements may have probably not undergone modification. In such a case, the processor 104 may avoid generation and pushing of any signal over the network, thereby avoiding unnecessary usage of network traffic and preventing an increase in network traffic.

Further, though it has been illustrated that the preliminary assessment and the subsequent assessment may be performed for the set of descriptive elements and the set of elementary descriptors. However, in one example, the preliminary assessment and the subsequent assessment may also be performed for the resource identifier, associated with the at least one resource from which the data transmission originated, and the elementary resource identifier, corresponding to that at least one resource, available in the resource inventory database 108 in a similar manner.

Thus, according to the present subject matter, the preliminary assessment of similarity between schemas of the received descriptive information and the retrieved elementary information may be performed. By performing the preliminary assessment, it may be determined whether the schemas are consistent with each other. In case the schemas are identified to be inconsistent, further processing and checking of similarity may be avoided, as the content therein may probably be incompatible for comparison and may provide erroneous results if compared. Avoiding unnecessary processing steps for incompatible data not only optimizes computing resource and processing power utilization to improve overall efficiency but also significantly reduces overall processing time.

Further, if the schemas are determined to be consistent, the second-level assessment, i.e., the subsequent assessment may be performed to determine whether the content present in set of descriptive elements is similar or consistent with the content present in the set of elementary descriptors. Based on the subsequent assessment, the information-variance signal may be generated to trigger rendering of the indication for indicating whether the content present in the set of descriptive elements has been modified, in comparison with the content present in the set of elementary descriptors available in the resource inventory database. By performing the two levels of checks, false detections may be reduced and accuracy of detection of data modification may be improved.

Figure 8B:
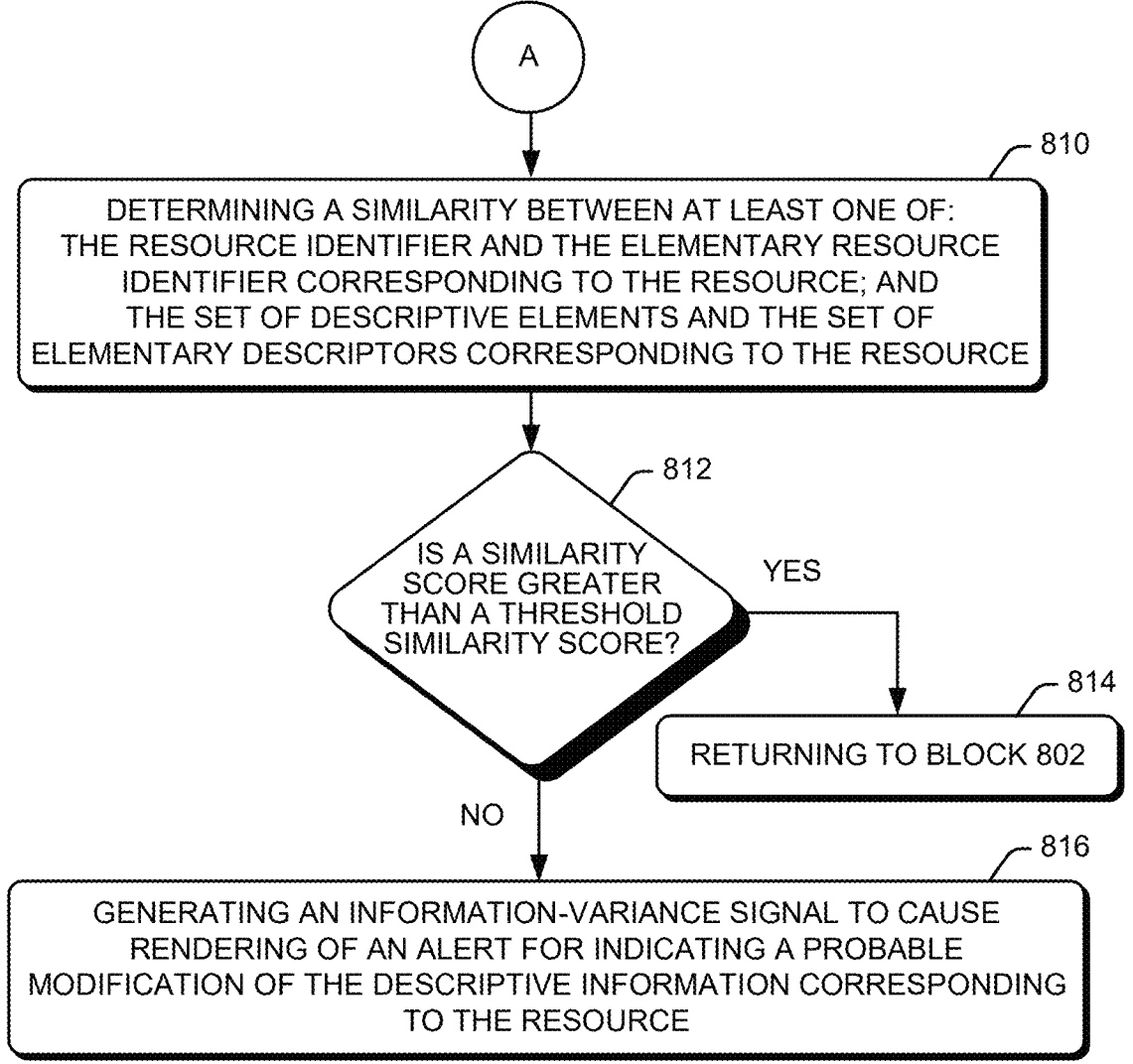

FIGS. 7 to 8B illustrate exemplary methods 700 and 800, respectively, for detecting modification in data. The order in which the methods are described is not intended to be construed as a limitation, and any number of the described method blocks may be combined in any order to implement the methods, or an alternative method. Furthermore, methods 700 and 800 may be implemented by processing resource or computing device(s) through any suitable hardware, non-transitory machine-readable instructions, or combination thereof.

It may also be understood that methods 700 and 800 may be performed by programmed computing devices, such as the processor 104, as depicted in FIGS. 1A-1C, 3, and 4. Furthermore, the methods 700 and 800 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. While the methods 700 and 800 are described below with reference to the processor 104 and the system 102 as described above; other suitable systems for the execution of these methods may also be utilized. Additionally, the implementation of these methods is not limited to such examples.

FIG. 7 illustrates the method 700 for detecting modification in data, according to an example implementation of the present subject matter.

At block 702, descriptive information associated with a resource, from amongst a plurality of resources, may be received. The descriptive information may indicate at least one of a resource identifier uniquely identifying the resource and a set of descriptive elements providing an insight about one or more aspects associated with the resource. Further, at least one of the resource identifier and the set of descriptive elements has a schema of representation.

At block 704, elementary information corresponding to the resource may be obtained from a resource inventory database, such as the resource inventory database 108. In one example, the elementary information may include at least one of an elementary resource identifier uniquely identifying the resource and a set of elementary descriptors providing an insight about the one or more aspects related to the resource. Further, at least one of the elementary resource identifier and the set of elementary descriptors has an elementary schema of representation.

At block 706, the schema of representation may be compared with the elementary schema of representation. In one example, the processor 104 may compare the schema of representation of at least one of the resource identifier and the set of descriptive elements associated with the resource, with the elementary schema of representation of at least one of the elementary resource identifier and the set of elementary descriptors associated with the resource. That is, the schema of representation of the resource identifier may be compared with the elementary schema of representation of the elementary resource identifier; and/or the schema of representation of the set of descriptive elements may be compared with the set of elementary descriptors. The comparison may be performed, for example, to assess a preliminary similarity between the schema of representation and the elementary schema of representation.

At block 708, it may be ascertained, based on the comparison, whether to determine a subsequent similarity between the received descriptive information and the retrieved elementary information. For example, if the schema of representation of the resource identifier is determined to be non-uniform with the elementary schema of representation of the elementary resource identifier; and/or the schema of representation of the set of descriptive elements is determined to be non-uniform with the elementary schema of representation of the set of elementary descriptors, it may be ascertained that the subsequent similarity determination should not be performed.

However, if the schema of representation of the resource identifier is determined to be uniform with the elementary schema of representation of the elementary resource identifier; and/or the schema of representation of the set of descriptive elements is determined to uniform with the elementary schema of representation of the set of elementary descriptors, it may be ascertained that the subsequent similarity between the received descriptive information and the retrieved elementary information should be determined, and the method may flow to block 710.

At block 710, based on the ascertaining, a similarity between at least one of (a) the resource identifier and the elementary resource identifier corresponding to the resource; and (b) the set of descriptive elements and the set of elementary descriptors corresponding to the resource, may be determined.

At block 712, an information-variance signal may be generated to cause rendering of an alert for indicating a probable modification of the descriptive information in comparison to the elementary information corresponding to the resource. In one example, the information-variance signal may be generated only upon determination of modification of the descriptive information.

FIGS. 8A and 8B illustrate the method 800 for detecting modification in data, according to another example implementation of the present subject matter. FIGS. 8A and 8B may be discussed in conjunction with FIGS. 1A to 2 and 4 for the sake of brevity.

At block 802, descriptive information associated with a resource, from amongst a plurality of resources, may be received. In one example, the descriptive information may be received from the resource and by a processor, such as the processor 104. In another example, the descriptive information may originate from the resource and may be communicated, indirectly, to the processor 104. In one example, it may also be possible that the descriptive information associated with the resource may be received from another database, similar to the resource inventory database 108, having descriptive information associated with each of the plurality of resources. In one example, the descriptive information may be received in response to a request made for the descriptive information associated with the resource. For example, the processor 104 may communicate with the resource, or the other database, to receive the descriptive information. In another example, the descriptive information may be received when the resource sends a data transmission for another resource. For instance, the descriptive information for the server 106-1C may be received.

The descriptive information, such as the descriptive information 410, may indicate at least one of a resource identifier uniquely identifying the resource and a set of descriptive elements providing an insight about one or more aspects associated with the resource. Further, at least one of the resource identifier and the set of descriptive elements has a schema of representation.

The descriptive information 410 may indicate, in one example, at least one of a resource identifier and a set of descriptive elements. As discussed above, the resource identifier may uniquely identify the resource, say the server 106-1C. Further, the set of descriptive elements, as discussed above, may provide an insight about the one or more aspects associated with the resource.

Further, in one example, at least one of the resource identifier and the set of descriptive elements may have a schema of representation. In one example, the schema of representation may indicate a manner, structure, or arrangement of different characters present in the resource identifier and the set of descriptive elements. As illustrated in Table 502, as one example, the arrangement of the numbers and "." may indicate the schema of representation of the resource identifier and the set of descriptive elements.

At block 804, elementary information corresponding to the resource may be obtained from the resource inventory database 108. In one example, the elementary information may include at least one of the elementary resource identifier uniquely identifying the resource and the set of elementary descriptors providing an insight about the one or more aspects related to the resource, as discussed above. In one example, the resource inventory database 108 may be accessed in response to receiving the descriptive information associated with the resource. As discussed above in one example, the resource inventory database 108 may store the elementary information corresponding to each resource in the plurality of resources. In one example, the resource inventory database 108 may be preconfigured with the elementary information associated with each resource To obtain the elementary information corresponding to the resource, the elementary information, available in the resource inventory database 108, corresponding to each of the plurality of resources may be accessed to search and identify the elementary information corresponding to the resource with which the descriptive information 410 is associated with. In one example, the required elementary information may be identified based on the resource identifier indicated by the descriptive information 410.

Further, as discussed above, at least one of the elementary resource identifier and the set of elementary descriptors has the elementary schema of representation. In one example, the elementary schema of representation may indicate a manner, structure, or arrangement of different characters present in the elementary resource identifier and the set of elementary descriptors. For example, as illustrated in FIG. 2 as one example, the elementary schema of representation may indicate the arrangement of the numbers and "." to describe the resource identifier and the set of elementary descriptors associated with, say, the server 106-1C. similarly, as illustrated in FIG. 2 as one example, the elementary schema of representation may indicate the arrangement of the numbers, alphabets, ":", and "_" to describe the resource identifier and the set of elementary descriptors associated with, say, the networking device 106-2A. Thus, the format or structure in which the elementary resource identifier and the set of elementary descriptors may be represented, may be referred to as the elementary schema of representation.

Further, the elementary information, such as the retrieved elementary information, may be an instance of the received descriptive information 410. As discussed above in one example, the elementary information and the descriptive information 410 may have similar properties. For example, the elementary information may comprise the elementary resource identifier and the set of elementary descriptors corresponding to the resource. Similarly, the descriptive information 410 may include the resource identifier and the set of descriptive elements related to the resource. Thus, both types of information may possess comparable attributes with respect to the resource. Since the elementary information and descriptive information 410 may pertain to the same resource, and the elementary information may be available in the resource inventory database 108 prior to reception of the descriptive information 410, the elementary information may be referred to as an earlier instance of the descriptive information 410 which is already stored in the resource inventory database 108. In essence, the elementary information may represent a preliminary version of the descriptive information 410 and may be present in the resource inventory database 108 before the reception of the descriptive information 410.

At block 806, the schema of representation may be compared with the elementary schema of representation. In one example, the schema of representation of the resource identifier may be compared with the elementary schema of representation of the elementary resource identifier; and/or the schema of representation of the set of descriptive elements may be compared with the set of elementary descriptors. The comparison may be performed, for example, to assess a preliminary similarity between the schema of representation and the elementary schema of representation.

In one example, any known technique may be used for comparing the schemas. For example, the structural representations of the set of descriptive elements and the elementary schema of representation may be analyzed to identify similarities and differences between the schemas. The schemas of the set of descriptive elements and the elementary schema of representation may be parsed to determine features indicated by the schemas. These may include, but are not limited to, identification of arrangement or placement of alphabets, numbers, special characters, spaces, and punctuations. By identifying the arrangement or placement, it may be ascertain whether the schemas are similar. That is, it may be determined which character appears in which sequence in both—the set of elementary descriptors and the set of descriptive elements.

In one example, one or more algorithms may be used to compare the schemas. For example, sequence matching algorithms, such as LCS, may be used for comparing the schemas. In another example, feature extraction algorithms may be used to determine the similarity between the schemas. In yet another example, pattern matching may be performed to determine the similarity between the schemas.

At block 808, it may be ascertained whether the schema of representation is similar to the elementary schema of representation. For example, based on the determinations of placements or sequences of texts, punctuations, and spaces, it may be ascertained whether the schemas are similar.

For example, if it is determined that the set of elementary descriptors indicates the software version as "14.1.0123" and the set of descriptive elements indicates the software version as "14.10.123", it may be ascertained that placement of characters, such as punctuations (".") is not similar to the one indicated in the elementary schema of representation. As illustrated in FIG. 6 as one example, the "." may be placed after 0 in the set of descriptive elements, whereas the "." may be placed before 0 in the set of elementary descriptors. Therefore, it may be ascertained that the schemas are different, and the method may follow the NO path to block

802 and further assessment(s) for the descriptive information may be aborted. In another example, though not illustrated in the method figures, it may be ascertained whether to update the elementary information with such descriptive information. For example, if it is determined that the modification in schema of the descriptive information was authorized, for instance, by the network administrator via the workstation 110, it may be ascertained that the elementary information is to be modified by updating the elementary schema of representation based on the schema of representation of the descriptive information. Thus, in such a case, a schema modification signal may be generated to trigger modification of the elementary schema of representation based on the schema of representation indicated by the descriptive information associated with the resource. Once the elementary schema of representation is updated, the method may then flow to block 802.

However, if the set of elementary descriptors indicates the software version as "14.1.0123" and the set of descriptive elements indicates the software version as "14.1.0123", it may ascertained that the placement of characters, including texts, punctuations, and spaces is same. It may thus be ascertained that the schemas may probably be similar to each other, and the method may follow the YES path to block A for subsequent assessment.

Similarly, the schema of representation of the resource identifier may also be compared with the elementary schema of representation of the elementary resource identifier. In one example, if the schema of representation of the resource identifier is determined to be different as compared to the elementary schema of representation of the elementary resource identifier, it may be ascertained that both the schema are different, and the method may follow the NO path to block 802. However, if the schema of representation of the resource identifier is determined to be consistent or same as compared to the elementary schema of representation of the elementary resource identifier, it may be ascertained that both the schema are same, and the method may follow the YES path to block A.

From block A and at block 810, a similarity between at least one of (a) the resource identifier and the elementary resource identifier corresponding to the resource; and (b) the set of descriptive elements and the set of elementary descriptors corresponding to the resource, may be determined. That is, the similarity between the resource identifier and the elementary resource identifier corresponding to the resource may be determined. Similarly, the similarity between the set of descriptive elements and the set of elementary descriptors corresponding to the resource may be determined. In another example, similarities for both types of data may be determined.

In one example, the subsequent assessment may be performed by deducing a similarity between at least one of (a) the resource identifier and the elementary resource identifier corresponding to the resource; and (b) the set of descriptive elements and the set of elementary descriptors corresponding to the resource, may be determined. To deduce the similarity, any combination of syntactic, semantic, and statistical analysis may be implemented. In one example, the similarity may be a semantic similarity that may be determined by analyzing the meaning and context of the content. For example, NPL techniques or trained LLMs may be used to identify analogus concepts. In another example, one or more models or machine learning algorithms may be accessed to determine the similarities. Other techniques may also be used, as discussed above. For example, ASCII equivalents and conversion into vector forms may also be performed to determine the similarities.

In one example, a similarity score may be computed, as discussed above. The similarity score may be computed for quantifying an extent of similarity between at least one of (a) the resource identifier and the elementary resource identifier; and (b) the set of descriptive elements and the set of elementary descriptors.

At block 812, it may be ascertained whether the similarity score is greater than a threshold similarity score. Once the similarity score has been computed, the computed similarity score may be compared with the threshold similarity score. In one example, the threshold similarity score may be a numerical value. The threshold similarity score may be defined, for example, by the network administrator via the workstation 110. Based on the comparison between the similarity score and the threshold similarity score, it may be ascertained whether at least one of a) the resource identifier and the elementary resource identifier; and (b) the set of descriptive elements and the set of elementary descriptors are same.

For example, if the similarity score is greater than the threshold similarity score, it may be ascertained that at least one of a) the resource identifier and the elementary resource identifier; and (b) the set of descriptive elements and the set of elementary descriptors are same. In this case, the method 800 may follow the YES path and flow to block 814 which refers to block 802, and the method 800 may either end or restart from block 802 where reception of a subsequent descriptive information from the same or another resource may be awaited.

However, if the similarity score is less than or equal to the threshold similarity score, it may be ascertained that there may be no similarity between at least one of a) the resource identifier and the elementary resource identifier; and (b) the set of descriptive elements and the set of elementary descriptors. In such a case, the method may follow the NO path and flow to block 816.

Further, in one example, the threshold similarity score may be a modifiable score. For example, the network administrator may be enabled to modify the threshold similarity score via the workstation 110. Thus, determination criteria may be dynamically downgraded or upgraded as per requirements. For example, if the network administrator requires more confident results, the threshold similarity score may be modified accordingly to filter specific similarity scores.

At block 816, an information-variance signal may be generated to cause rendering of an alert for indicating a probable modification of the descriptive information in comparison to the elementary information corresponding to the resource. In one example, the information-variance signal may be generated only upon determination of modification of the descriptive information.

In one example, the information-variance signal may be a set of instructions that may cause the rendering of the alert. For example, the alert may indicate, for example, which part of the descriptive information, i.e., the resource identifier or the set of descriptive elements has undergone modification. In one example, it may also be possible that the resource identifier and the set of descriptive elements may have at least partially been modified. In such cases, the alert may indicate the modification. The alert, in one example, may indicate the modified portion of descriptive information as compared to the elementary information. Therefore, the alert may clearly indicate the modification that the descriptive information may have probably undergone. Further, the alert may be at least one of an audio alert and a visual alert. In one example, the information-variance signal may cause the generation of at least one of the audio alert and the visual alert. In one example, the audio alert and the visual alert may be similar to the audio indication and the visual indication, as discussed above.

FIG. 9 illustrates a non-transitory computer-readable medium for detecting modification in data, in accordance with an example of the present subject matter. FIG. 9 will be discussed with reference to FIGS. 1A to 1C, 2, and 4 for the sake of brevity.

In an example, the computing environment 900 includes a processor 902 communicatively coupled to a non-transitory computer-readable medium 904 through communication link 906. In one example, the processor 902 may have one or more processing resources for fetching and executing computer-readable instructions from the non-transitory computer-readable medium 904. The processor 902 and the non-transitory computer-readable medium 904 may be implemented, for example, in the system 102.

The non-transitory computer-readable medium 904 may be, for example, an internal memory device or an external memory. In an example implementation, the communication link 906 may be a network communication link, or other communication links, such as a PCI (Peripheral component interconnect) Express, USB-C(Universal Serial Bus Type-C) interfaces, 12C (Inter-Integrated Circuit) interfaces, etc. In an example implementation, the non-transitory computer-readable medium 904 includes a set of computer-readable instructions 908 which may be accessed by the processor 902 through the communication link 906. The processor 902 and the non-transitory computer-readable medium 904 may also be communicatively coupled to the resource inventory database 108 over the communication link 906.

Referring to FIG. 9, in one example, the non-transitory computer-readable medium 904 includes computer-readable instructions 908 that may cause the processor 902 to receive descriptive information from a resource associated with a network having a plurality of resources. The network may be, for example, any of the networks 106-1, 106-2, . . . , and 106-N. In another example, the network may be a combination of the networks 106-1, 106-2, . . . , and 106-N. Further, the descriptive information may indicate at least one of a resource identifier that may uniquely identify the resource and a set of descriptive elements that may provide an insight about one or more aspects related to the resource, as discussed above. Further, the set of descriptive elements may have the schema of representation, as discussed above. In one example, the schema of representation may be a protocol according to which the set of descriptive elements may be represented. That is, the characters in the set of descriptive elements may be represented in accordance with the protocol.

The non-transitory computer-readable medium 904 includes computer-readable instructions 908 that may further cause the processor 902 to obtain elementary information corresponding to the resource. As discussed above, the resource inventory database 108 may include elementary information for each resource associated with the network. In one example, the processor 902 may access the resource inventory database 108 to obtain the elementary information corresponding to the resource. As discussed above, the elementary information may include at least one of elementary resource identifier uniquely identifying the resource and the set of elementary descriptors providing an insight about one or more aspects of the resource. Further, the elementary information may be an instance of the descriptive information stored in the resource inventory database 108 before reception of the descriptive information from the resource. In one example, the elementary schema of representation may be a protocol according to which the set of elementary descriptors may be represented. That is, the characters in the set of elementary descriptors may be represented in accordance with the protocol.

The non-transitory computer-readable medium 904 includes computer-readable instructions 908 that may further cause the processor 902 to perform, in response to obtaining the elementary information, a preliminary assessment of similarity between the schemas of the received descriptive information and the retrieved elementary information. In one example, the preliminary assessment may be performed by comparing the schema of representation of the set of descriptive elements and the elementary schema of representation of the set of elementary descriptors associated with the resource, as discussed above.

The non-transitory computer-readable medium 904 includes computer-readable instructions 908 that may further cause the processor 902 to ascertain, based on the preliminary assessment, whether to perform the subsequent assessment of similarity between the received descriptive information and the retrieved elementary information. For example, if the processor 902 determines, based on the preliminary assessment, that the schema of representation of the set of descriptive elements is non-compliant with the elementary schema of representation of the set of elementary descriptors, the processor 902 may ascertain that the subsequent assessment may not be required to be performed. However, if the processor 902 determines that the schema of representation of the set of descriptive elements complies with the elementary schema of representation, the processor 902 may only then ascertain to perform the subsequent assessment.

The non-transitory computer-readable medium 904 includes computer-readable instructions 908 that may further cause the processor 902 to perform the subsequent assessment upon ascertaining that the schemas comply with each other. In one example, the subsequent assessment may be performed by deducing a similarity between at least one of (a) the resource identifier and the elementary resource identifier corresponding to the at least one resource; and (b) the set of descriptive elements and the set of elementary descriptors corresponding to the resource. That is, the similarity between the resource identifier and the elementary resource identifier corresponding to the resource may be determined. Similarly, similarity between the set of descriptive elements and the set of elementary descriptors corresponding to the resource may be determined. In another example, similarities for both types of data could also be determined.

In one example, non-transitory computer-readable medium 904 includes computer-readable instructions 908 that may further cause the processor 902 to compute a similarity score to determine a degree of similarity between (a) the resource identifier and the elementary resource identifier corresponding to the resource; and (b) the set of descriptive elements and the set of elementary descriptors corresponding to the resource, as discussed above. The computed similarity scores may then be compared with the threshold similarity score to ascertain the modification of the descriptive information, as discussed above.

Further, the non-transitory computer-readable medium 904 includes computer-readable instructions 908 that may further cause the processor 902 to generate, based on the determination of similarity in the subsequent assessment, an information-variance signal for indicating modification of the descriptive information, or at least a part thereof, in comparison with the elementary information corresponding to the resource. In one example, non-transitory computer-readable medium 904 includes computer-readable instructions 908 that may further cause the processor 902 to cause rendering of an indication for alerting about the modification of the descriptive information. The indication may include, for example, at least one of the audio indication and the visual indication.

Thus, the present subject matter may address multiple technical challenges. For example, by performing the preliminary assessment, it may be determined whether the schemas are consistent with each other. In case the schemas are identified to be inconsistent, further processing of such inconsistent data may be avoided to prevent any erroneous results derived based on the inconsistent data. Avoiding unnecessary processing steps for incompatible data may also improve operation efficiency and resource utilization. Further, by performing the two levels of checks, the present subject matter discloses a comprehensive procedure for detection of data modification with improved accuracy and confidence or assurance. Also, the present subject matter may significantly reduce false detection scenarios.

Although examples of the present subject matter have been described in language specific to methods and/or structural features, it is to be understood that the present subject matter is not limited to the specific methods or features described. Rather, the methods and specific features are disclosed and explained as examples of the present subject matter.

What is claimed is:

1. A system comprising:
a processor to:
   receive a data transmission from at least one resource amongst a set of resources, the data transmission comprising descriptive information associated with the at least one resource, the descriptive information indicating at least one of a resource identifier uniquely identifying the at least one resource and a set of descriptive elements providing an insight about one or more aspects related to the at least one resource, wherein the set of descriptive elements has a schema of representation;
   retrieve, from a resource inventory database, elementary information corresponding to the at least one resource, wherein the elementary information is an instance of the descriptive information available in the resource inventory database prior to reception of the data transmission from the at least one resource, the elementary information comprising at least one of:
      an elementary resource identifier uniquely identifying the at least one resource; and
      a set of elementary descriptors providing an insight about the one or more aspects related to the at least one resource, wherein the set of elementary descriptors has an elementary schema of representation;
   perform, in response to the retrieval of the elementary information, a preliminary assessment of similarity between schemas of the received descriptive information and the retrieved elementary information, the preliminary assessment being performed by comparing:
      the schema of representation of the set of descriptive elements associated with the at least one resource; and

the elementary schema of representation of the set of elementary descriptors associated with the at least one resource;

ascertain, based on the preliminary assessment, whether to perform a subsequent assessment of similarity between the received descriptive information and the retrieved elementary information;

perform, based on the ascertaining, the subsequent assessment by deducing a similarity between the set of descriptive elements and the set of elementary descriptors corresponding to the at least one resource; and generate, based on the subsequent assessment, an information-variance signal to trigger rendering of an indication to indicate a probable modification of the set of descriptive elements in comparison with the set of elementary descriptors corresponding to the at least one resource.

2. The system of claim 1, the system further comprising the resource inventory database communicably coupled with the processor, the resource inventory database comprising elementary information corresponding to each resource in the set of resources, the elementary information comprising:

an elementary resource identifier uniquely identifying each resource in the set of resources; and a set of elementary descriptors associated with each resource in the set of resources, the set of elementary descriptors providing an insight about the one or more aspects related to each resource.

3. The system of claim 2, wherein the processor is to:

access the elementary information, from the resource inventory database, corresponding to each resource in the set of resources; and identify an elementary information, from the resource inventory database, having an elementary resource identifier similar to the resource identifier received in the data transmission.

4. The system of claim 1, wherein the instance of the descriptive information is the elementary information, corresponding to the at least one resource, available in the resource inventory database prior to reception of the data transmission from the at least one resource.

5. The system of claim 1, wherein, to deduce the similarity, the processor is to parse the set of descriptive elements and the set of elementary descriptors corresponding to the at least one resource.

6. The system of claim 1, wherein the processor is to:

compute a similarity score for quantifying an extent of similarity between the set of descriptive elements and the set of elementary descriptors corresponding to the at least one resource; and compare the similarity score with a threshold similarity score to ascertain the probable modification of the set of descriptive elements.

7. The system of claim 1, wherein if the processor determines, based on the preliminary assessment, that the schema of representation is consistent with the elementary schema of representation, the processor is to perform the subsequent assessment.

8. The system of claim 1, wherein if the processor determines, based on the preliminary assessment, that the schema of representation is inconsistent with the elementary schema of representation, the processor is to generate a schema modification signal to trigger modification of the elementary schema of representation, available in the resource inventory database, based on the schema of representation indicated by the descriptive information.

9. The system of claim 1, wherein the indication comprises at least one of an audio indication and a visual indication for indicating the probable modification of the set of descriptive elements.

10. The system of claim 1, wherein the processor is to cause rendering of at least one interactive interface for rendering the indication.

11. A method comprising:

receiving a descriptive information associated with a resource from amongst a plurality of resources, the descriptive information indicating at least one of a resource identifier uniquely identifying the resource and a set of descriptive elements providing an insight about one or more aspects associated with the resource, wherein at least one of the resource identifier and the set of descriptive elements has a schema of representation;

obtaining, from a resource inventory database, elementary information corresponding to the resource, the elementary information comprising at least one of:

an elementary resource identifier uniquely identifying the resource; and a set of elementary descriptors providing an insight about the one or more aspects related to the resource, wherein at least one of the elementary resource identifier and the set of elementary descriptors has an elementary schema of representation;

comparing the schema of representation, of at least one of the resource identifier and the set of descriptive elements associated with the resource, with the elementary schema of representation, of at least one of the elementary resource identifier and the set of elementary descriptors associated with the resource, to assess a preliminary similarity between the schema of representation and the elementary schema of representation;

ascertaining, based on the comparison, whether to determine a subsequent similarity between the received descriptive information and the retrieved elementary information;

determining, based on the ascertaining, a similarity between at least one of:

the resource identifier and the elementary resource identifier corresponding to the resource; and the set of descriptive elements and the set of elementary descriptors corresponding to the resource; and generating, based on the determination of similarity, an information-variance signal to cause rendering of an alert for indicating a probable modification of the descriptive information in comparison to the elementary information corresponding to the resource.

12. The method of claim 11, wherein the elementary information indicates a version of the descriptive information stored in the resource inventory database at least prior to reception of the descriptive information from the resource.

13. The method of claim 11, the method further comprising:

computing a similarity score for quantifying an extent of similarity between at least one of:

the resource identifier and the elementary resource identifier corresponding to the resource; and the set of descriptive elements and the set of elementary descriptors corresponding to the resource; and comparing the similarity score with a threshold similarity score to ascertain the probable modification of the descriptive information.

14. The method of claim 13, wherein the threshold similarity score is a modifiable score.

15. The method of claim 11, the method further comprising ascertaining, based on the assessment of preliminary similarity between the schema of representation and the elementary schema of representation, whether to generate a schema modification signal to trigger modification of the elementary schema of representation based on the schema of representation associated with the resource.

16. The method of claim 11, wherein the alert comprises at least one of an audio alert and a visual alert for indicating the probable modification of the descriptive information.

17. A non-transitory computer-readable medium comprising instructions being executable by a processing resource to:

receive descriptive information from a resource associated with a network comprising a plurality of resources, the descriptive information indicating at least one of a resource identifier uniquely identifying the resource and a set of descriptive elements providing an insight about one or more aspects related to the resource, wherein the set of descriptive elements has a schema of representation;

obtain, from a resource inventory database, elementary information corresponding to the resource, wherein the elementary information is an instance of the descriptive information stored in the resource inventory database before reception of the descriptive information from the resource, the elementary information comprising at least one of:

an elementary resource identifier uniquely identifying the resource; and a set of elementary descriptors providing an insight about the one or more aspects related to the resource, wherein at least one of the elementary resource identifier and the set of elementary descriptors has an elementary schema of representation;

perform, in response to the obtaining the elementary information, a preliminary assessment of similarity between the received descriptive information and the retrieved elementary information by comparing:

the schema of representation of the set of descriptive elements associated with the resource; and the elementary schema of representation of the set of elementary descriptors associated with the resource;

ascertain, based on the comparison, whether to perform a subsequent assessment of similarity between the received descriptive information and the retrieved elementary information;

determine, in response to ascertaining to perform the subsequent assessment, a similarity between at least one of:

the resource identifier and the elementary resource identifier corresponding to the at least one resource; and the set of descriptive elements and the set of elementary descriptors corresponding to the resource; and generate, based on the determination of similarity, an information-variance signal for indicating modification of the descriptive information in comparison to the elementary information.

18. The non-transitory computer-readable medium of claim 17, wherein the instructions are executed by the processing resource to access the elementary information, from the resource inventory database, corresponding to each resource amongst the plurality of resources to identify the elementary information corresponding to the resource.

19. The non-transitory computer-readable medium of claim 17, wherein the instructions are executed by the processing resource to:

compute a similarity score to determine a degree of similarity between at least one of:

the resource identifier and the elementary resource identifier corresponding to the resource; and the set of descriptive elements and the set of elementary descriptors corresponding to the resource; and compare the similarity score with a threshold similarity score to ascertain the modification of the descriptive information.

20. The non-transitory computer-readable medium of claim 17, wherein the instructions are executed by the processing resource to cause rendering of an indication for alerting about the modification of the descriptive information, the indication comprising at least one of an audio indication and a visual indication.

* * * * *